United States Patent
Kim et al.

(10) Patent No.: US 10,080,181 B2
(45) Date of Patent: Sep. 18, 2018

(54) METHOD FOR BARRING NETWORK ACCESS FOR EACH APPLICATION, AND USER EQUIPMENT

(71) Applicant: LG ELECTRONICS INC., Seoul (KR)

(72) Inventors: Jaehyun Kim, Seoul (KR); Youngdae Lee, Seoul (KR); Laeyoung Kim, Seoul (KR); Ki-Dong Lee, Seoul (KR); Hyunsook Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 14/915,979

(22) PCT Filed: Jun. 29, 2015

(86) PCT No.: PCT/KR2015/006654
§ 371 (c)(1),
(2) Date: Mar. 2, 2016

(87) PCT Pub. No.: WO2016/003140
PCT Pub. Date: Jan. 7, 2016

(65) Prior Publication Data
US 2016/0219493 A1    Jul. 28, 2016

Related U.S. Application Data

(60) Provisional application No. 62/018,677, filed on Jun. 30, 2014, provisional application No. 62/077,290, filed on Nov. 9, 2014, provisional application No. 62/105,725, filed on Jan. 20, 2015, provisional application No. 62/153,497, filed on Apr. 27, 2015, provisional application No. 62/159,992, filed on May 12, 2015.

(51) Int. Cl.
*G06F 11/00* (2006.01)
*H04J 1/16* (2006.01)
(Continued)

(52) U.S. Cl.
CPC ......... *H04W 48/06* (2013.01); *H04L 47/2433* (2013.01); *H04L 47/2475* (2013.01);
(Continued)

(58) Field of Classification Search
CPC . H04W 48/06; H04W 4/003; H04W 28/0289; H04L 47/2433; H04L 47/2475
(Continued)

(56) References Cited

U.S. PATENT DOCUMENTS 9,860,824 B2 * 1/2018 Kim ..................... H04W 48/06
2013/0045706 A1   2/2013 Hsu
(Continued)

FOREIGN PATENT DOCUMENTS

JP     2013-236169 A    11/2013
WO     13-141600 A1     9/2013
(Continued)

OTHER PUBLICATIONS

U.S. Appl. No. 61/872,272.*
(Continued)

*Primary Examiner* — Chuong T Ho
(74) *Attorney, Agent, or Firm* — Dentons US LLP

(57) ABSTRACT

One embodiment of the present specification provides a method of attempting network access by user equipment (UE). The method comprises the steps of: acquiring, from an upper layer, information related to an application attempting network access when an application specific congestion control for data communication (ACDC) is configured; determining an ACDC category on the basis of the acquired information related to an application; and performing an ACDC test on the basis of the determined ACDC category, wherein a network access trial can be barred or allowed for each application according to the ACDC test.

14 Claims, 23 Drawing Sheets

(51) Int. Cl.
  *H04J 3/14* (2006.01)
  *H04L 12/26* (2006.01)
  *H04W 48/06* (2009.01)
  *H04W 4/60* (2018.01)
  *H04W 4/00* (2018.01)
  *H04W 28/02* (2009.01)
  *H04L 12/859* (2013.01)
  *H04L 12/851* (2013.01)

(52) U.S. Cl.
  CPC ............ *H04W 4/003* (2013.01); *H04W 4/60* (2018.02); *H04W 28/0289* (2013.01)

(58) Field of Classification Search
  USPC .......................................................... 370/230
  See application file for complete search history.

(56) References Cited

U.S. PATENT DOCUMENTS

| | | |
|---|---|---|
| 2013/0051325 A1 | 2/2013 | Ryu et al. |
| 2013/0170479 A1 | 7/2013 | Fong et al. |
| 2014/0128029 A1 | 5/2014 | Fong et al. |
| 2015/0289195 A1* | 10/2015 | Gogic ................... H04W 48/06 370/230 |
| 2016/0014632 A1* | 1/2016 | Siow ..................... H04L 5/0085 370/230 |
| 2016/0212653 A1* | 7/2016 | Wang ................. A61B 10/0051 |

FOREIGN PATENT DOCUMENTS

| | | |
|---|---|---|
| WO | 14-007592 A1 | 1/2014 |
| WO | 14-160611 A1 | 10/2014 |

OTHER PUBLICATIONS

WO2014/160611.*
U.S. Appl. No. 61/976,867, filed Apr. 8, 2014.*
NTT Docomo et al., : "Number of ACDC categories (changes to TR)", 3GPP Draft; S1-143118, 3rd Generation Partner Ship Project (3GPP); Mobile Competence Center; 650, Route Des Lucioles; F-06921 Sophia-Anti Polis Cedex; France Aug. 9, 2014.*
SP-140238: 3GPP TSG SA Meeting #64, Sophia-Antipolis, France, Jun. 16-18, 2014, TSG SA WG1, TR 22.806 on Study for Application-Specific Congestion Control for Data Communication (FS_ACDC), Version 2.0.0, Fig C-1.

* cited by examiner

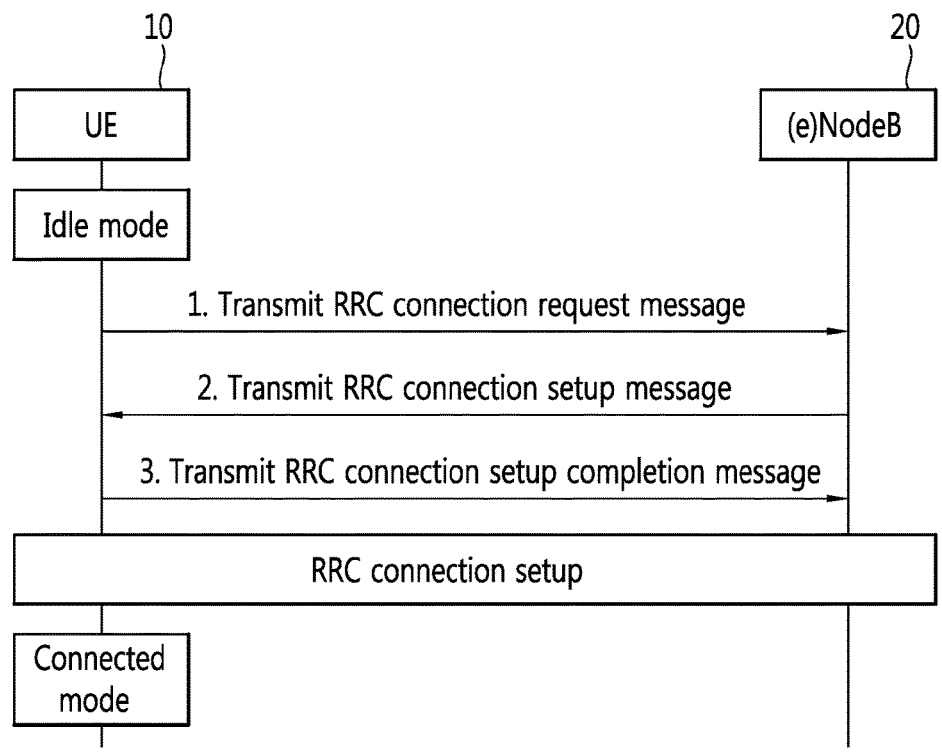

METHOD FOR BARRING NETWORK ACCESS FOR EACH APPLICATION, AND USER EQUIPMENT

This application is a National Stage Entry of International Application No. PCT/KR2015/006654, filed on Jun. 29, 2015, and claims the benefit of and priority to Provisional Application Nos. 62/018,677, filed Jun. 30, 2014, 62/077,290 filed Nov. 9, 2014, 62/105,725 filed Jan. 20, 2015, 62/153,497 filed Apr. 27, 2015, and 62/159,992 filed May 12, 2015, all of which are hereby incorporated by reference in their entirety for all purposes as if fully set forth herein.

BACKGROUND OF THE INVENTION

Field of the Invention

The present invention relates to a technique of barring access for congestion control in a mobile communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| REFERENCE POINT | DESCRIPTION |
|---|---|
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, when the UE 10 requests the RRC connection for the purpose of data transmission of the user plane, if the network, for example, the base station (that is, eNodeB) is in the congest state, the UE 10 may reject the request for the RRC connection.

In the overload and congest situation of the network, a method for differentiating the service per specific application of the UE is required. However, in the related art, there is no method of implementing the method.

SUMMARY OF THE INVENTION

Accordingly, an object of the present invention is to present a method that can solve the aforementioned problem.

In order to achieve the aforementioned purpose, one disclosure of the present specification provides a method for trying a network access. The method may be performed by a user equipment (UE) and comprise: acquiring information related to an application which tries a network access when an application specific congestion control for data communication (ACDC) is configured; determining an ACDC category based on the acquired information related to the application; and performing an ACDC check, based on the determined ACDC category. Here, the network access may be barred or allowed per the application, according to the ACDC check.

The information related to the application includes at least one of: a group of the application, a category of the application, a priority of the application, information on the application and an identifier of the application.

The ACDC check may be performed based on ACDC configuration information which is defined per a unit of specific application.

The ACDC configuration information may include: a barring rate, a barring factor, a barring time, roaming information, and a ACB skipping configuration which are defined per a unit of specific application.

The unit of the specific application may be defined as a unit of a group of application, a category of application, a priority of application, or information/identifier of application.

The determining of the ACDC category may include: if a plurality of the information related to application are acquired from the higher layer, determining the ACDC category based on information related to application which has a highest rank or information related to application has a lowest rank.

The performing of the ACDC check may include: performing the ACDC check based on either the information related to the application which has the highest rank or the information related to the application has the lowest rank, among the plurality of ACDC categories.

The determining of the ACDC category may include: if a plurality of the information related to application are acquired from the higher layer, determining a plurality of ACDC categories.

In order to achieve the aforementioned purpose, one disclosure of the present specification also provides a user equipment (UE) for trying a network access. The UE may comprise: a transceiver; and a processor configured control the transceiver and configured to perform: acquiring information related to an application which tries a network access from a higher layer when an application specific congestion control for data communication (ACDC) is configured; determining an ACDC category based on the acquired information related to the application; and performing an ACDC check, based on the determined ACDC category. Here, the network access may be barred or allowed per the application, according to the ACDC check.

According to the embodiments of the present invention, the problems in the related art can be solved.

BRIEF DESCRIPTION OF THE DRAWINGS

FIG. 5b illustrates a connection process in a radio resource control (RRC) layer.

DESCRIPTION OF EXEMPLARY EMBODIMENTS

Figure 1:
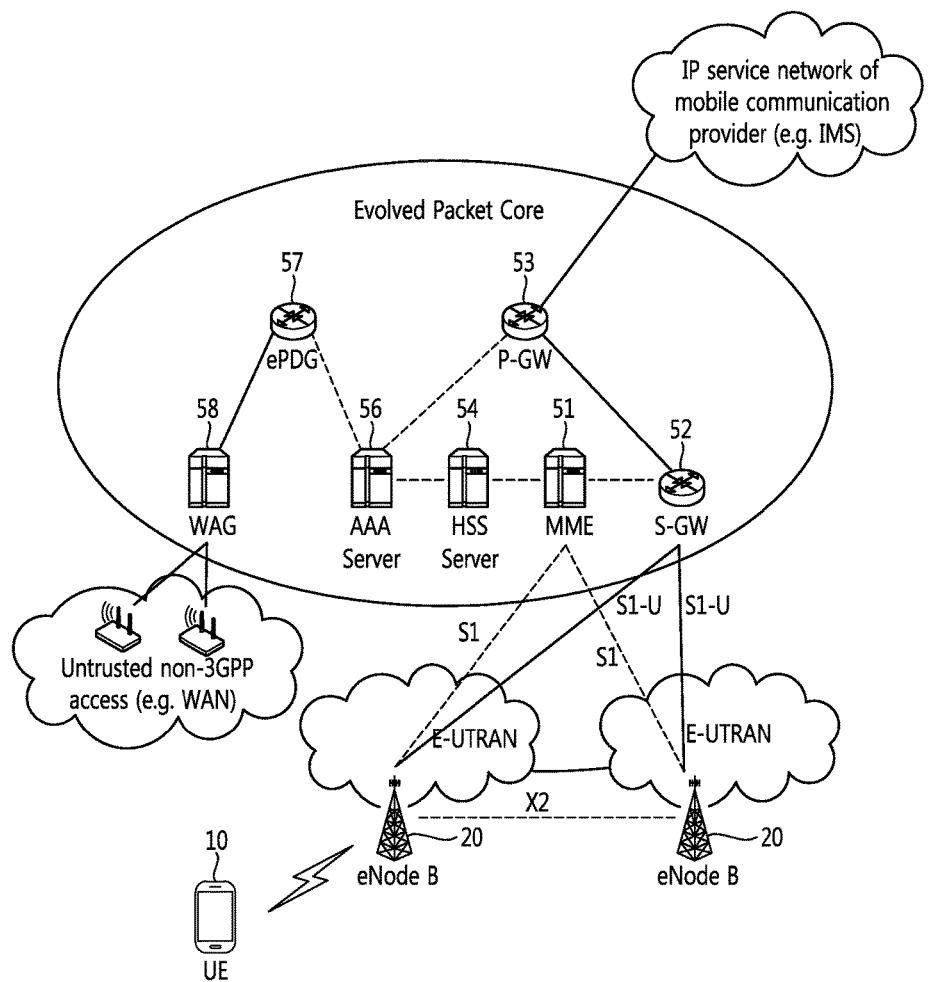
FIG. 1 is a structural diagram of an evolved mobile communication network.
Figure 2:
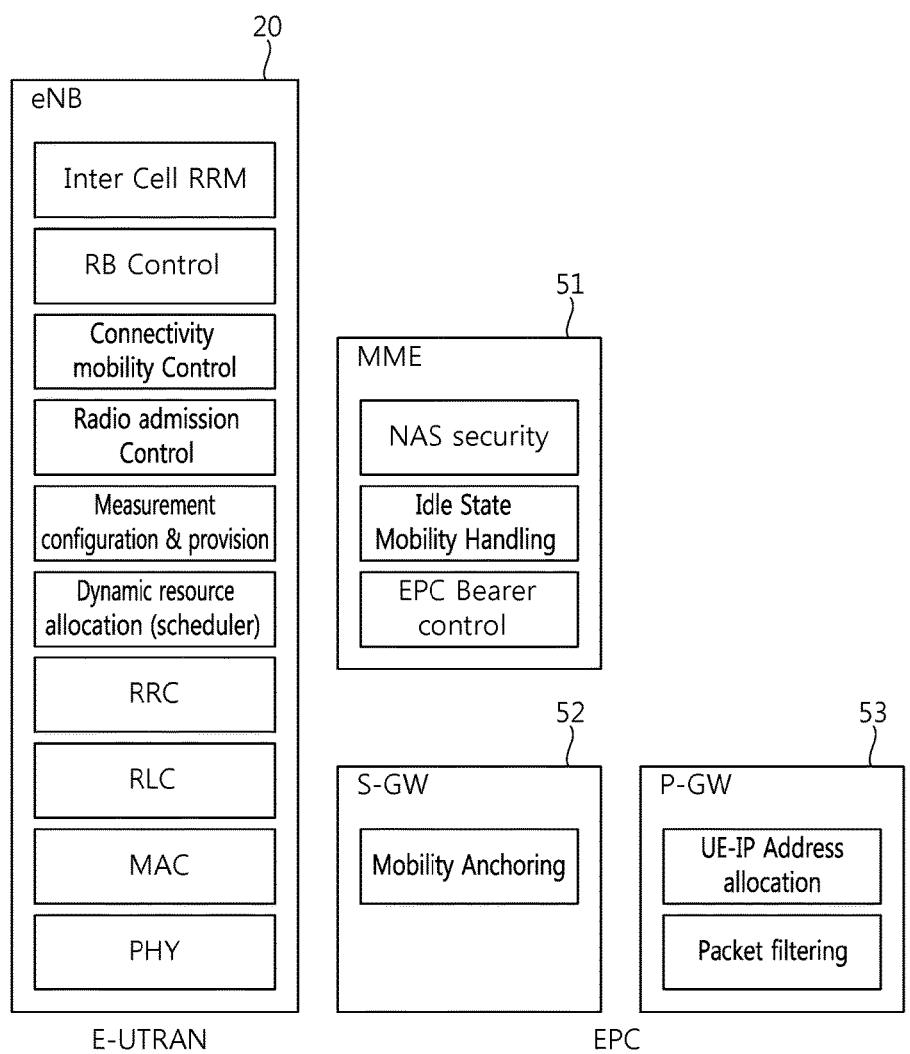
FIG. 2 is an exemplary diagram illustrating architectures of a general E-UTRAN and a general EPC.
Figure 3:
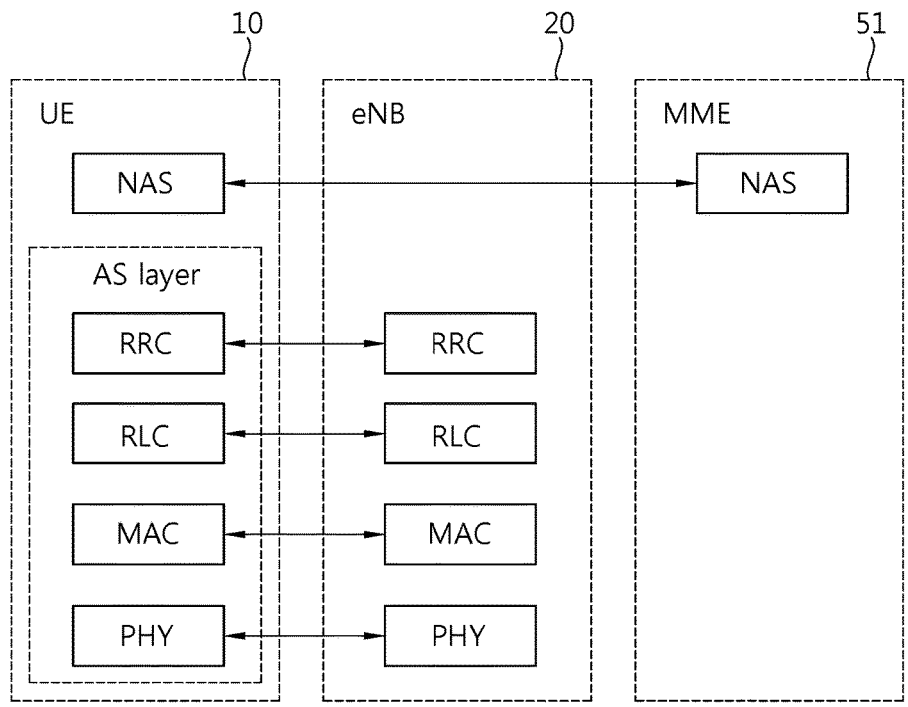
FIG. 3 is an exemplary diagram illustrating a structure of a radio interface protocol on a control plane between UE and eNodeB.
Figure 4:
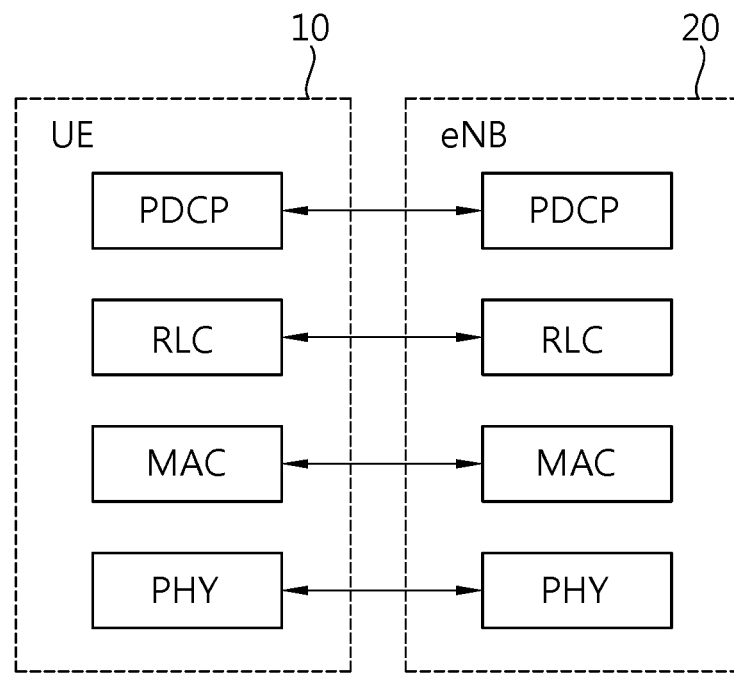
FIG. 4 is another exemplary diagram illustrating a structure of a radio interface protocol on a user plane between the UE and a base station.
Figure 5A:
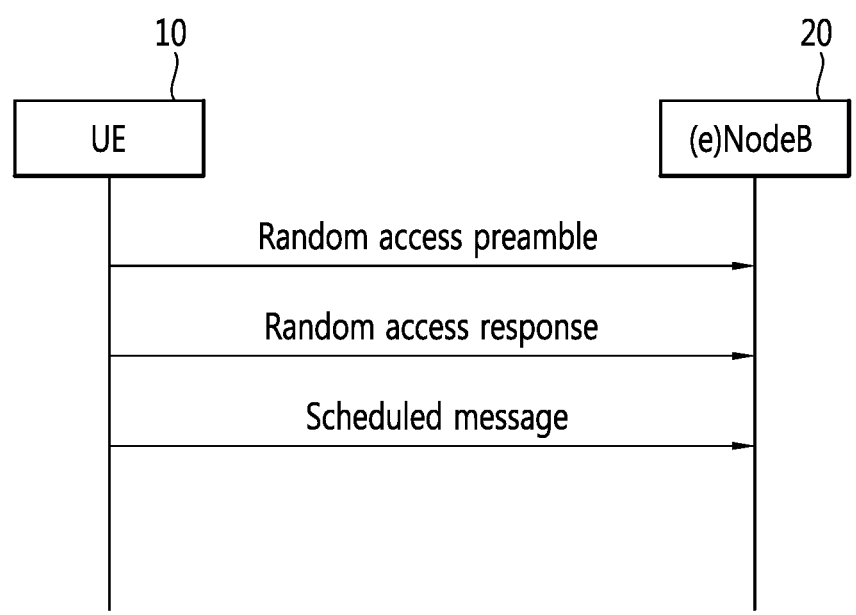
FIG. 5a is a flowchart illustrating a random access process in 3GPP LTE.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

Hereinafter, an aspect of the present specification is described with reference to the accompanying drawings.

Figure 6:
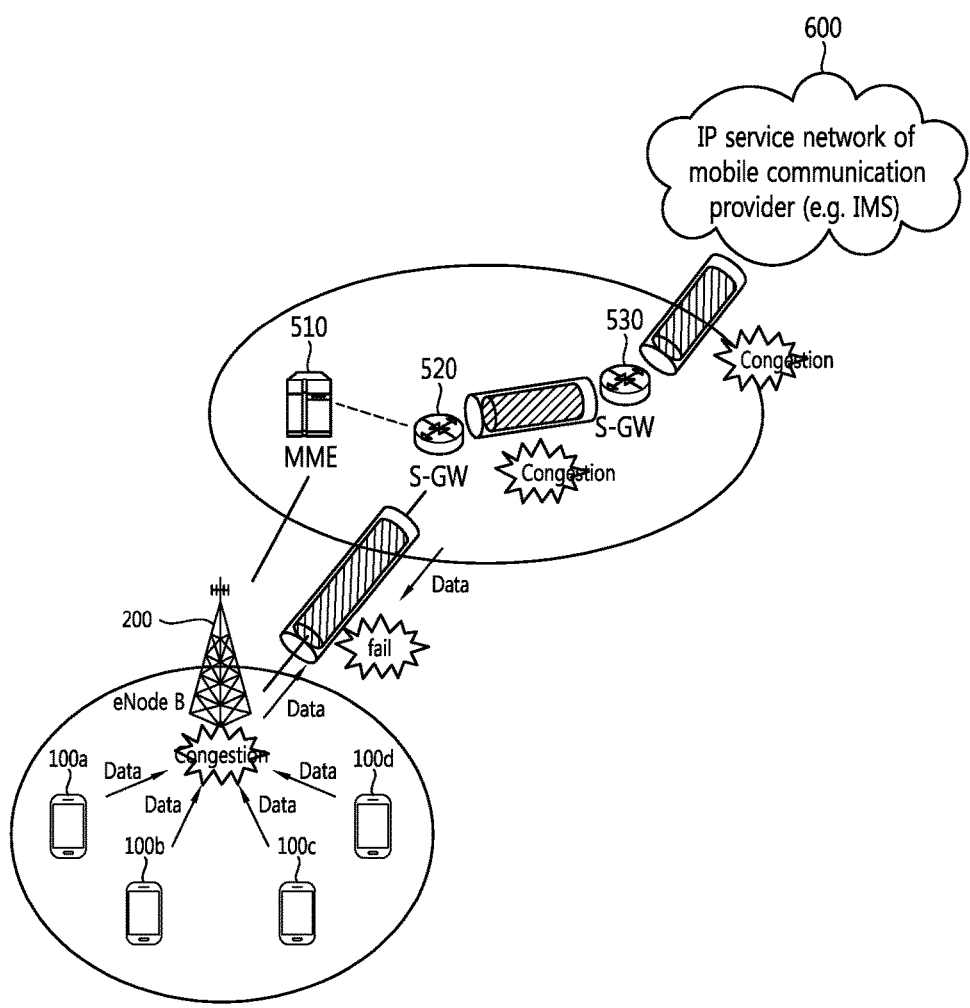
FIG. 6 illustrates a network overloaded state.

FIG. 6 shows a network overload state.

As shown in FIG. 6, many UEs 100*a*, 100*b*, 300*c*, and 300*d* are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100*a*, 100*b*, 300*c*, and 300*d* or uplink data from the UEs 100*a*, 100*b*, 300*c*, and 300*d* is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7:
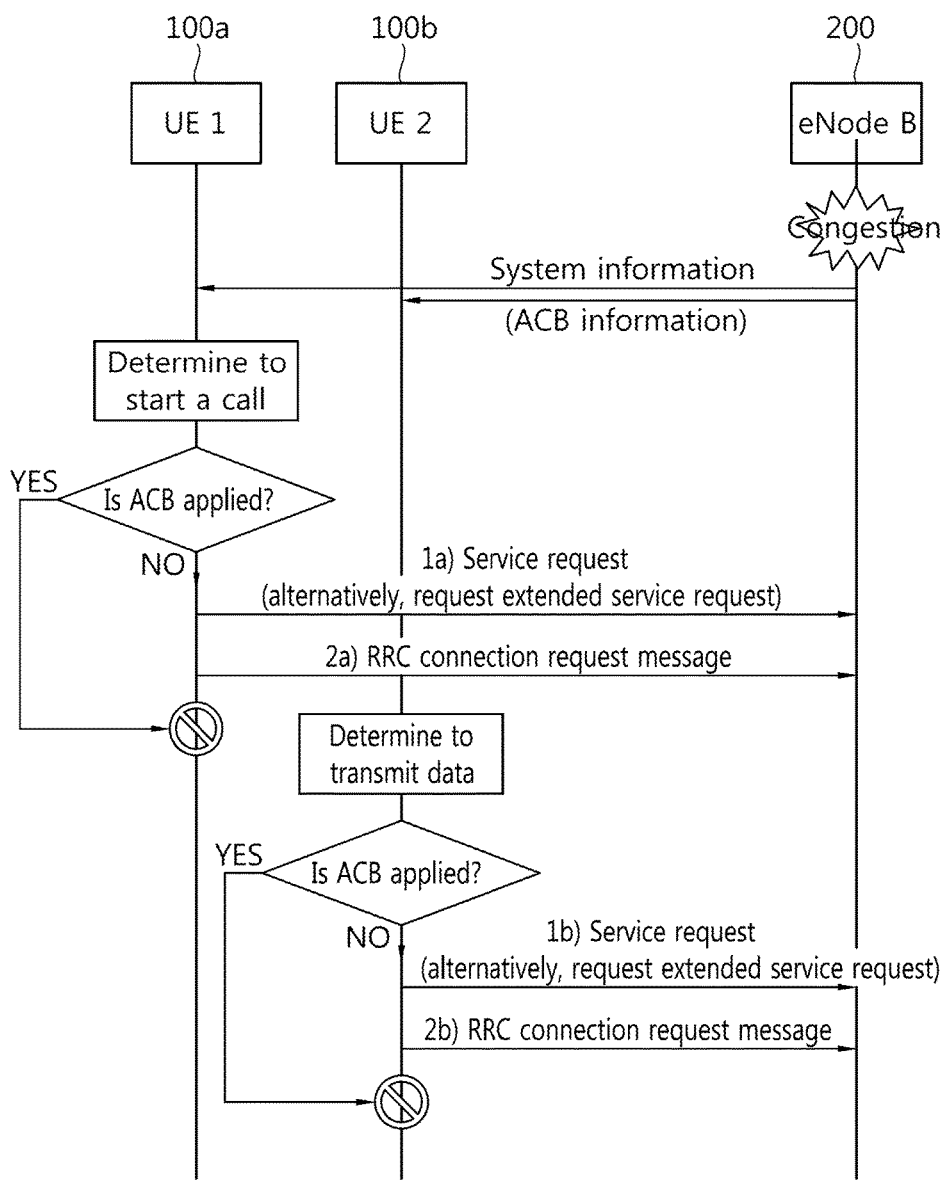
FIG. 7 is an exemplary flowchart illustrating an access barring operation in a network congested state.

FIG. 7 is an exemplary flowchart illustrating an access barring operation in a network congested state.

As illustrated in FIG. 7, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
| --- | --- |
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100a determines an IMS service, for example, mobile orienting of a call by VoLTE and generates a service request message. Similarly, UE2 100b determines mobile orienting of general data and generate the service request message.

Sequentially, the UE1 100a generates an RRC connection request message. Similarly, the UE2 100b generate the RRC connection request message.

Meanwhile, the UE1 100a performs access barring check (that is, whether the ACB is applied). Similarly, the UE2 100b performs access barring check (that is, whether the ACB is applied).

If the ACB is not applied, the UE1 100a and the UE2 100b may transmit a service request (alternatively, an extended service request) message and the RRC connection request message, respectively. However, when the ACB is applied, both the UE1 100a and the UE2 100b may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100a and the UE2 100b. Then, the UE1 100a and the UE2 100b verify whether the access barring is applied, by using a barring factor included in the received ACB-related information, based on the stored access class. The access barring check is performed in each access stratum (AS) layer, that is, an RRC layer of the UE1 100a and the UE2 100b.

The access barring check will be described in more detail as follows.

The ac-BarringPerPLMN-List is included in the SIB type 2 received by each of the UE1 100a and the UE2 100b, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100a and the UE2 100b perform the RRC connection request, the access barring check is performed by using T303 as Tbarring and using ac-BarringForMO-Data as a barring parameter.

When the barring is determined, each AS(RRC) layer of the UE1 100a and the UE2 100b notifies a failure of the RRC connection establishment to the higher layer.

Subsequently, as such, when the access is barred, each AS(RRC) layer determines whether a T302 timer or a Tbarring timer is driving. If the timer is not driving, the T302 timer or the Tbarring timer is driven.

Meanwhile, while the T302 timer or a Tbarring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, the access barring check performs general mobile originating (MO) services of the UE, for example, originating call, originating data, originating IMS voice, and originating IMS video. That is, the ACB is applied to access of all application programs (but, except for a response to an emergency service or paging).

Figure 8:
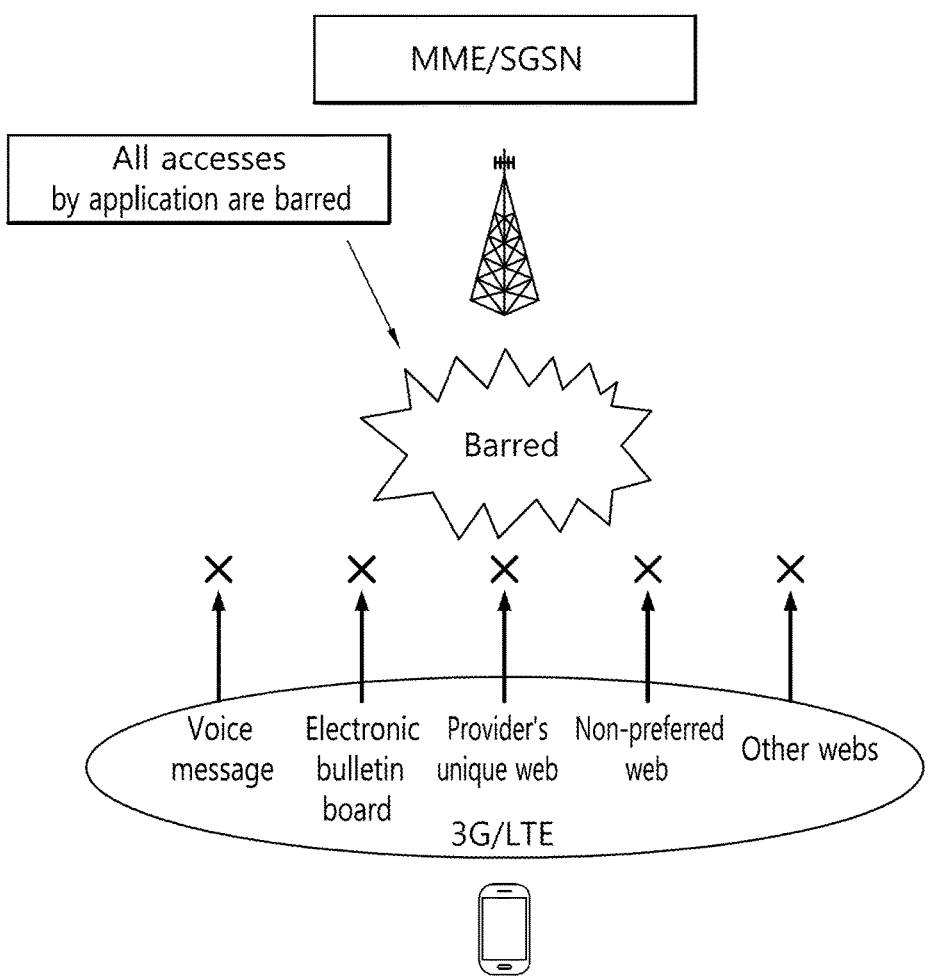
FIG. 8 illustrates an example in which an access due to all applications is barred, when ACB is applied.

FIG. 8 illustrates an example in which access due to all applications is barred, when ACB is applied.

As illustrated in FIG. 8, when it is determined that the ACB is applied, the access due to all of the applications of the UE (but, except for the response to an emergency service or paging) is fully barred.

As such, the access due to all of the applications is barred and thus, the differentiated service is impossible. The problem deteriorates network resource waste and user's experience.

Accordingly, in the network overload and congest situation, a method for differentiating an MO service for each specific application group/category (for example, originating call or originating data) is required. However, in the related art, there is no method of implementing the method.

[Exemplary Embodiments of this Specification]

Exemplary embodiments of the present invention provide a method of differentiating general mobile originating (MO) services of the UE, for example, originating call, originating data, originating IMS voice, and originating IMS video. The method is referred to as an application specific congestion control for data communication (ACDC).

In order to differentiate the service of the specific application, the exemplary embodiments of the present invention provide that a network (MME/SGSN/S-GW/P-GW and the like) provides/notifies application-related information, that is, application group/category/priority information/ID to the UE. The application-related information, that is, the application group/category/priority information/ID may be notified to the UE by the network through attach procedure/TAU procedure/RAU procedure. That is, the network may provide/notify the application-related information to the UE through an attach accept message, a TAU accept message, and a RAU accept message. Further, the application-related information, that is, the application group/category/priority information/ID may be defined/configured in an NAS configuration management object (MO) or a new application MO (for example, an application specific access control MO). In this case, the application-related information, that is, the application group/category/priority information/IDs may be provided to the UE through the OMA DM-based NAS configuration MO or the new application MO.

If not, the application-related information, that is, the application group/category/priority information/ID may be pre-configured in an USIM and the like of the UE.

The application-related information, that is, the application group/category/priority information/ID may have values in ascending order according to priority thereof. In derail, when the application-related information, that is, the application group/category/priority information/ID=1 (alternatively, binary and/or string), the application-related information means the highest/primary priority. The application service having the highest/primary priority may mean that the ACB needs to be passed with the first priority (that is, barring rate is low). When the application-related information, that is, the application group/category/priority information/ID=2 (alternatively, B, binary and/or string), the application-related information means the second priority. The application service having the second priority may mean that the ACB needs to be passed with the second priority. When the application-related information, that is, the application group/category/priority information/ID=n (alternatively, Z, binary and/or string), the application-related information may mean the lowest priority. The application service having the lowest priority may mean that the ACB needs to be passed with the last priority (that is, the barring rate is high).

On the contrary, the application-related information, that is, the application group/category/priority information/ID may have values in descending order according to priority thereof. When the application-related information, that is, the application group/category/priority information/ID=1 (alternatively, A, binary and/or string), the application-related information may mean the lowest priority. As such, the application service having the lowest priority may mean that the ACB needs to be passed with the last priority (that is, the barring rate is high). When the application group/category/priority information/ID=n (or Z, other binary and/or string, etc), the application group/category/priority information/ID means the highest/primary priority, and the application service may mean that the ACB needs to be passed with the first priority (that is, barring rate is low).

On the other hand, the network (for example, the base station) may provide ACDC configuration information (that is, information such as barring rates, barring factor, mean barring time, roaming information, and ACB skipping configuration for each application group/category/priority information/ID) to the UE through the SIB. Herein, the ACB skipping configuration may be expressed by ACB skipping=On/True or ACB skipping=Off/False. Herein, the roaming information may mean information on whether to apply a function (ACDC check) of differentiating whether the access is barred for each application group/category/priority information/ID while the UE is roamed.

The ACDC configuration information (that is, the information such as barring rates, barring factor, mean barring time, roaming information, and ACB skipping configuration for each application group/category/priority information/ID) provided by the SIB from the network (eNB) may be periodically provided/updated.

I. Proposal 1 of the Present Invention

According to the proposal 1 of the present invention, the AS layer (RRC) of the UE may receive the ACDC configuration information (that is, the information such as barring rates, barring factor, mean barring time, roaming information, and ACB skipping configuration for each application group/category/priority information/ID) provided from the network.

Accordingly, according to the proposal 1 of the present invention, the AS(RRC) layer of the UE may perform the access barring check (that is, the ACDC check). As such, when the AS(RRC) layer of the UE performs the access barring check, the AS(RRC) layer performs the ACDC check for each application group/category/priority information/ID based on the ACDC configuration information provided from the network (for example, the base station). Herein, the performing of the ACDC check means determining whether the application service access attempt is allowed or not by using the ACDC configuration information (that is, the information such as barring rates, barring factor, mean barring time, and roaming information for each application group/category/priority information/ID) when the application service starts. When the application service access attempt is allowed, the application service starts in the application layer as it is and service section access to the network will be progressed, and when the application service access attempt is not allowed, the application service section access to the network will be not attempted at all.

Further, when the AS(RRC layer of the UE performs the access barring check, the access barring check may be skipped (that is, the ACDC check is skipped) for each application group/category/priority information/ID based on the ACB skipping configuration information provided in the network (for example, the base station).

When the ACDC configuration information (that is, the information including barring rates, barring factor, mean barring time, roaming information, and the like for each application group/category/priority information/ID) of the proposal and the ACB information are simultaneously provided from the network (for example, the base station) to the UE, the UE may perform only the ACDC check by applying only the ACDC configuration information. That is, the ACB applying the ACB information may not be performed.

If not, the UE may select and apply one of the ACDC configuration information of the proposal and the general ACB information from the network (MME/SGSN/base station, or the like) according to indication/configuration. That is, the ACB check is performed or the ACDC check may be performed.

The proposal 1 may be applied to both an IDLE mode and a CONNECTED mode of the UE.

If not, in the proposal 1, the UE may perform the ACDC check by differently applying the ACDC configuration information according to whether the UE is the IDLE mode or the CONNECTED mode (for example, an EMM-IDLE/RRC-IDLE mode or an EMM-CONNECTED/RRC-CONNECTED mode).

The proposal 1 described above is classified into proposals 1a, 1b, and 1c. The proposals will be described in detail with reference to the accompanying drawings.

Figure 9:
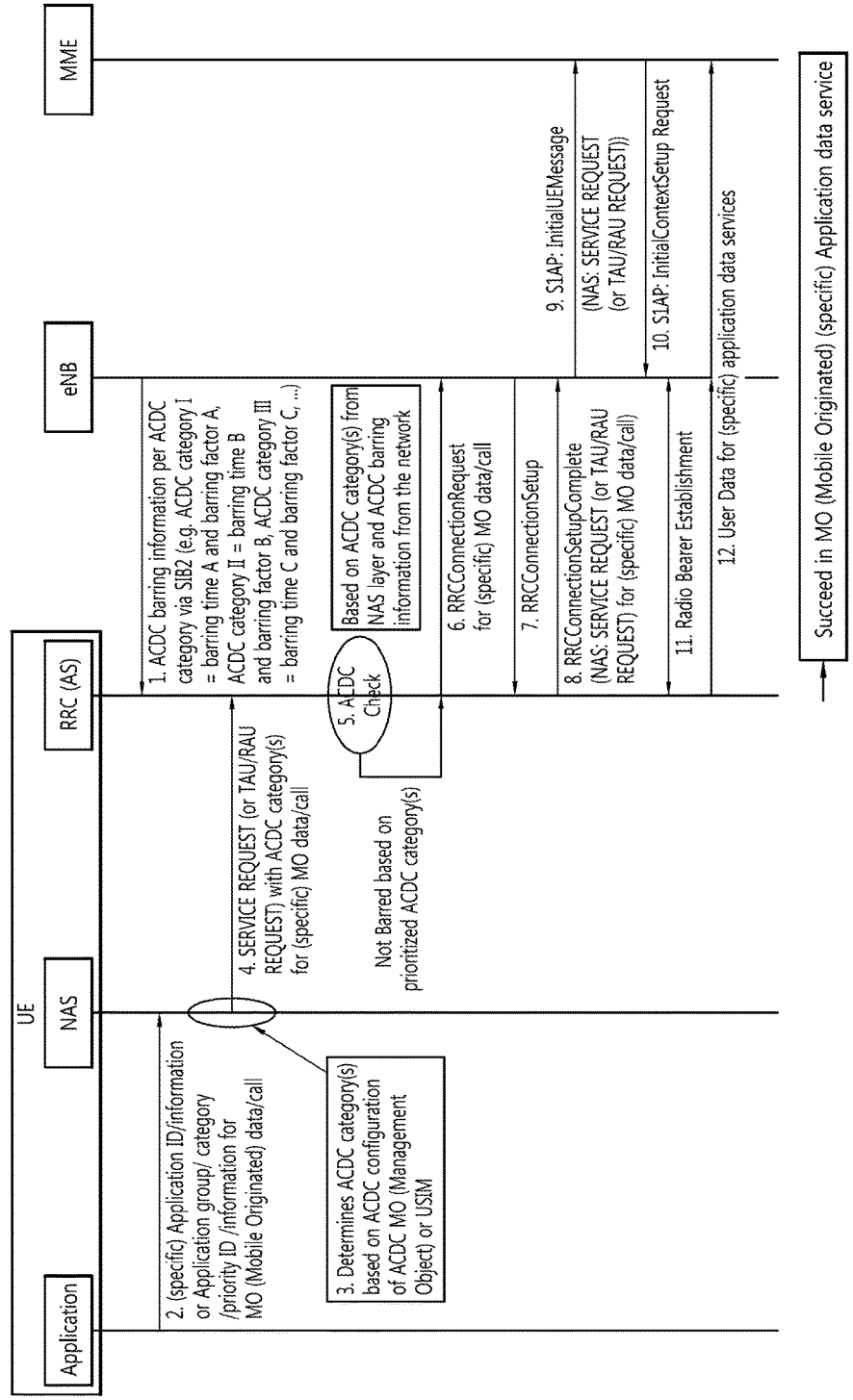
FIG. 9 is a signal flowchart illustrating a proposal 1a of the present invention.

FIG. 9 is a signal flowchart illustrating a proposal 1a of the present invention.

The proposal 1a will be described below with reference to FIG. 9.

(Step 1) The network (for example, the base station) may provide ACDC configuration information (that is, information including barring rates, barring factor, mean barring time, roaming information, ACB skipping configuration, and the like of the ACDC for each application group/category/priority information/ID) to the UE through the SIB.

(Step 1) Meanwhile, when a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

Simultaneously or separately with/from the application-related information, indication information such as Start/Stop or Set/Reset which notifies a start and an end of the application service may be provided to the NAS or RRC layer. In this case, the ACDC check may be performed from the time of receiving the Start/Set to the time of receiving the Stop/Reset.

(Step 3) The NAS layer determines an application category for the ACDC, based on the application-related information, that is, the application group/category/priority information/ID received from the application layer. For example, when receiving the ID of the corresponding application from the application layer, the NAS layer determines whether the ID of the corresponding application corresponds to any application category of the ACDC.

(Step 4) The NAS layer transmits the application-related information or the application-related information+the indication information such as Start/Stop or Set/Reset received from the application layer to the AS(RRC) layer together, when a service request procedure for the application service access (transmission of SERVICE REQUEST message or transmission of EXTENDED SERVICE REQUEST message) starts. When receiving the Start/Set indication information from the application layer, the NAS layer may transmit the application-related information to the AS(RRC) layer when the service request procedure for the application service access (transmission of SERVICE REQUEST message or transmission of EXTENDED SERVICE REQUEST message) starts. When receiving the Stop/Reset indication information from the application layer, the NAS layer does not transmit the application-related information to the AS(RRC) layer when the service request procedure for the application service access (transmission of SERVICE REQUEST message or transmission of EXTENDED SERVICE REQUEST message) of a TAU/RAU request procedure starts.

When the application-related information or the application-related information+the indication information such as Start/Stop or Set/Reset received from the application layer is multiple or the application-related information is changed in an NAS recovery process, i) only the highest application-related information is provided to the AS(RRC) layer;

ii) only the lowest application-related information is provided to the AS(RRC) layer; or iii) all of a plurality of application-related information may be provided to the AS(RRC) layer.

In the NAS recovery, when re-transmission for the application service access due to radio link failure (RLF) or a failure/error of the lower layer occurs, the AS layer (for example, the RRC layer) notifies the failure/error of the lower layer to the NAS layer, and the NAS layer performs the NAS recovery procedure for NAS signaling access (re)configuration. The service request procedure or the TAU request procedure for NAS recovery may be performed, and the service request procedure may be performed in the case where there is uplink data, and the TAU request procedure may be performed in the case where there is no uplink data.

The schemes i), ii), and iii) are recognized and determined by the NAS layer, and in this case, one of the schemes i), ii), and iii) may be implemented and operated by network configuration/policy, UE capability, and the like.

(step 5) In the case of receiving the application-related information or the application-related information+the indication information such as Start/Stop or Set/Reset from the application layer, the AS(RRC), when the service request procedure (transmission of SERVICE REQUEST message or transmission of EXTENDED SERVICE REQUEST message) for the application service access of a TAU/RAU request procedure starts, the AS(RRC) layer determines whether the application service access (the service request procedure or the TAU/RAU request procedure) attempt is allowed or not by using the ACDC configuration information (that is, information including barring rates, barring factor, mean barring time, roaming information, ACB skipping configuration, and the like provided for each application group/category/priority information/ID) received from the network.

When the application-related information or the application-related information+the indication information such as Start/Stop or Set/Reset received from the application layer is multiple or changed in an NAS recovery process, i) The AS(RRC) layer determines whether the application service access (the service request procedure or the TAU/RAU request procedure) attempt is allowed or not by using the ACDC configuration information (that is, information including barring rates, barring factor, mean barring time, roaming information, and the like provided for each application group/category/priority information/ID) received from the network based on the highest application-related information.

ii) The AS(RRC) layer determines whether the application service access (the service request procedure or the TAU/RAU request procedure) attempt is allowed or not by using the ACDC configuration information (that is, information including barring rates, barring factor, mean barring time, roaming information, and the like provided for each application group/category/priority information/ID) received from the network based on the lowest application-related information.

The schemes i) and ii) are recognized and determined by the AS(RRC) layer, and in this case, one of the schemes i) and ii) may be implemented and operated by network configuration/policy, UE capability, and the like.

Figure 10:
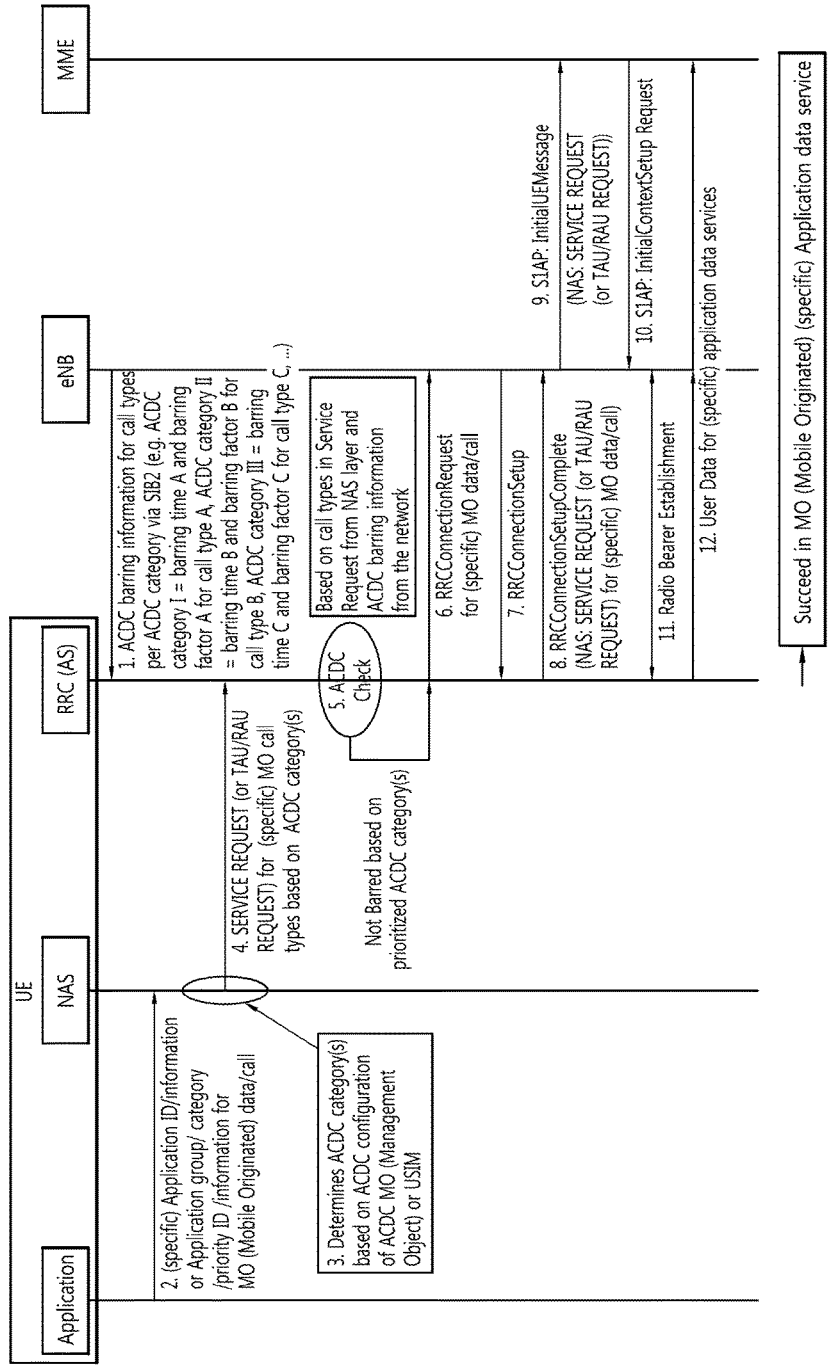
FIG. 10 is a signal flowchart illustrating a proposal 1b of the present invention.

FIG. 10 is a signal flowchart illustrating a proposal 1b of the present invention.

The proposal 1b illustrated in FIG. 10 is different from the proposal 1a illustrated in FIG. 9 only in a few points. Hereinafter, different parts will be mainly described.

(step 4) The NAS layer may define new RRC establishment factor values, new call types, or service types (for each application group/category/priority information/ID) to transmit the defined new RRC establishment factor values, new call types, or service types to the AS(RRC) layer, when the service request procedure (transmission of SERVICE REQUEST message or transmission of EXTENDED SERVICE REQUEST message) or the TAU/RAU request procedure starts. In this case, the new RRC establishment factor values, the new call types, or the service types are used independently (only alone) or may be defined and used in combination. In the case of receiving the Start/Set indication information from the application layer, the NAS layer may define new RRC establishment factor values, new call types, or service types (for each application group/category/priority information/ID) to transmit the defined new RRC establishment factor values, new call types, or service types to the AS(RRC) layer when the service request procedure (transmission of SERVICE REQUEST message or transmission of EXTENDED SERVICE REQUEST message) or TAU/RAU request procedure for the application service access starts. In the case of receiving the Stop/Reset indication information from the application layer, thereafter, the NAS layer perform the an existing general service request procedure (transmission of SERVICE REQUEST message or transmission of EXTENDED SERVICE REQUEST message) or TAU/RAU request procedure for the application service access. That is, the existing service request procedure or TAU/RAU request procedure in which new RRC establishment factor values, new call types, or service types for each application group/category/priority information/ID are not defined is performed.

When the application-related information or the application-related information+the indication information such as Start/Stop or Set/Reset received from the application layer is multiple or changed in an NAS recovery process, i) Based on the highest application-related information, when the service request procedure (transmission of SERVICE REQUEST message or transmission of EXTENDED SERVICE REQUEST message) or the TAU/RAU request procedure starts, new RRC establishment factor values, new call types, or service types (for each application group/category/priority information/ID) are defined to be provided to the AS(RRC) layer. (In this case, the new RRC establishment factor values, the new call types, or the service types are used independently (only alone) or may be defined and used in combination); or i) Based on the lowest application-related information, when the service request procedure (transmission of SERVICE REQUEST message or transmission of EXTENDED SERVICE REQUEST message) or the TAU/RAU request procedure starts, new RRC establishment factor values, new call types, or service types (for each application group/category/priority information/ID) are defined to be provided to the AS(RRC) layer. (In this case, the new RRC establishment factor values, the new call types, or the service types are used independently (only alone) or may be defined and used in combination); or The schemes i) and ii) are recognized and determined by the NAS layer, and in this case, one of the schemes i) and ii) may be implemented and operated by network configuration/policy, UE capability, and the like.

(step 5) The AS(RRC) layer determines whether the application service access (the service request procedure or the TAU/RAU request procedure) attempt is allowed by using the ACDC configuration information (that is, the information including barring rates, barring factor, mean barring time, roaming information, and the like provided for each application group/category/priority information/ID) received from the network, when the service request procedure (transmission of SERVICE REQUEST message or transmission of EXTENDED SERVICE REQUEST message) or the TAU/RAU request procedure for the application service access of the NAS layer starts (when the service request procedure or the TAU/RAU request procedure starts by defining new RRC establishment factor values, new call types, or service types (for each application group/category/priority information/ID)) based on the application-related information (that is, the new RRC establishment factor values, the new call types, or the service types (for each application group/category/priority information/ID) from the NAS layer (in this case, the new RRC establishment factor values, the new call types, or the service types are used independently (only alone) or may be defined and used in combination).

Herein, the AS(RRC) layer may recognize the application group/category/priority based on the new RRC establishment factor values, the new call types, or the service types for each application group/category/priority information/ID from the NAS layer. Accordingly, the AS(RRC) layer may determine whether the application service access (the service request procedure or the TAU/RAU request procedure) attempt is allowed or not by using the ACDC configuration information (information including barring rates, barring factor, mean barring time, roaming information, and the like provided for each application group/category/priority information/ID) received from the network.

Figure 11:
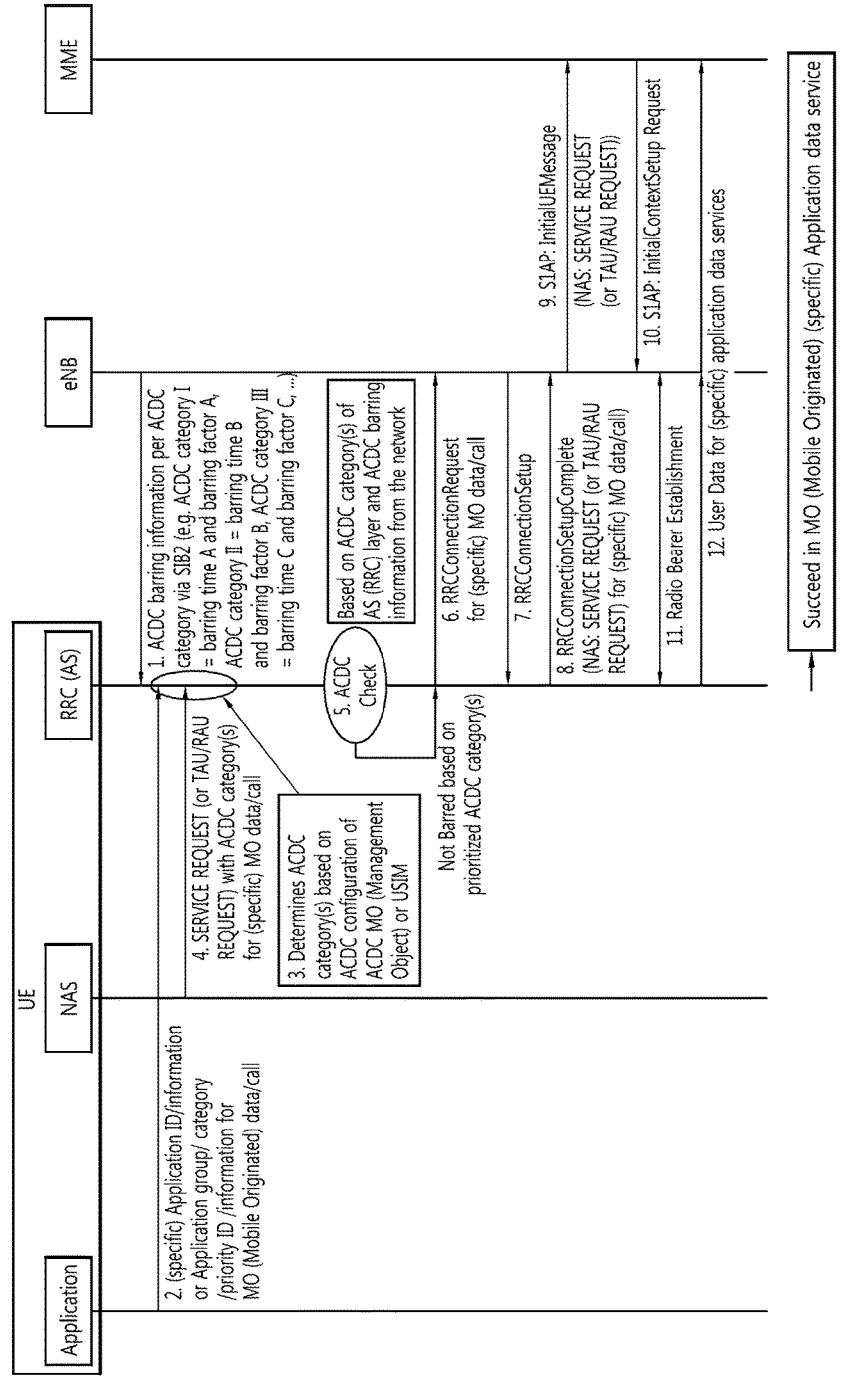
FIG. 11 is a signal flowchart illustrating a proposal 1c of the present invention.

FIG. 11 is a signal flowchart illustrating a proposal 1c of the present invention.

The proposal 1c illustrated in FIG. 11 is different from the proposals 1a and 1b only in a few points. Hereinafter, different parts will be mainly described.

(Step 2) When a specific application is executed and a data communication service is required by the specific application in the UE, an application layer taking charge of executing the specific application provides the application-related information (that is, the application group/category/priority information/ID) to the NAS layer.

(Step 3) The AS(RRC) layer determines an application category for the ACDC based on the application-related information received from the application layer. For example, when receiving the ID of the corresponding application from the application layer, the NAS layer determines whether the ID of the corresponding application corresponds to any application category of the ACDC.

(step 5) In the case of receiving the application-related information or the application-related information+indication information such as Start/Stop or Set/Reset from the application layer, when the service request procedure (transmission of SERVICE REQUEST message or transmission of EXTENDED SERVICE REQUEST message) or the TAU/RAU request procedure for the application service access of the NAS layer starts, the AS(RRC) layer determines whether the application service access (the service request procedure or the TAU/RAU request procedure) attempt is allowed or not, by using the ACDC configuration information (the information including barring rates, barring factor, mean barring time, roaming information, and the like provided for each application group/category/priority information/ID) received from the network.

II. Proposal 2 of the Present Invention (Proposal 3 Disclosed in Provisional Application)

The proposal 2 (the proposal 3 of the provisional application) is similar to those illustrated in FIGS. 9, 10, and 11. Accordingly, the proposal 2 will be described with reference to FIGS. 9, 10, and 11 as it is without referring to a separate drawing.

(step 0) A network (provider) provides (alternatively, provide the application-related information (the application group/category/priority information/ID) to the UE. For example, the application-related information (the application group/category/priority information/ID) is provided to the UE through the application MO (for example, the MO per application (access control)) using the OMA DM or (pre)configured in the USIM to be provided to the UE. The NAS layer or the application layer of the UE or an application control layer including an operating system (OS) or the AS(RRC) layer may obtain the application group/category/priority information/IDs through AT-command and the like.

Accordingly, the application-related information is preprovided from the network (provider) to recognize the NAS layer or the application layer of the UE or the application control layer including the OS. The application-related information may be provided to the UE periodically or at a specific time from the network (provider).

(step 1) The network (provider) provides the ACDC configuration information (that is, information including barring rates, barring factor, mean barring time, roaming information, ACB skipping configuration, and the like for each application group/category/priority information/ID) to the UE through the SIB. The ACDC configuration information may be provided by the UE in an EMM-IDLE or EMM-CONNECTED mode (RRC-IDLE or RRC-CONNECTED mode). The ACDC configuration information may be received from the network by the AS(RRC) layer of the UE.

(step 2) In the case of the service access attempt for providing the application service (that is, MO data or MO signaling), the application layer provides the obtained application-related information (the application group/category/priority information/ID) and the application ID/information/indication to the NAS layer. Further, (Service access section) set/start indication/information may be provided to the NAS layer together.

(step 4) When receiving a request for starting the application service from the application layer, the NAS layer performs the service request procedure (transmission of SERVICE REQUEST message or transmission of EXTENDED SERVICE REQUEST message) or the TAU/RAU request procedure (transmission of the TAU request message). In this case, the application-related information+ the application ID/information/indication is transmitted to the AS(RRC) layer.

In the case where the application-related information+ application ID/information/indication received from the application layer is multiple or changed in the NAS recovery process, i) only the highest application-related information application ID/information/indication is provided to the AS(RRC) layer;

ii) only the lowest application-related information application ID/information/indication is provided to the AS(RRC) layer; or iii) all of the multiple application-related information+ application ID/information/indication may be provided to the AS(RRC) layer.

The schemes i), ii), and iii) are recognized and determined by the NAS layer, and in this case, one of the schemes i), ii), and iii) may be implemented and operated by network configuration/policy, UE capability, and the like.

In the case of receiving additionally (alternatively, separately) setting/start indication/information from the application layer, when the ACB is applied to the current (UE), the NAS layer ignores the barring state and starts/performs the service request procedure (transmission of SERVICE REQUEST message or transmission of EXTENDED SERVICE REQUEST message) or the TAU/RAU request procedure (transmission of the TAU request message) for the application service access. When the service request procedure or the TAU procedure starts, the application-related information+ACB skipping indication (for example, ACB skip-ON, SET or TRUE for group/category/priority "X") is transmitted to the AS(RRC) layer.

Alternatively, when receiving a request for starting the application service from the application layer, the NAS layer performs the service request procedure (transmission of SERVICE REQUEST message or transmission of EXTENDED SERVICE REQUEST message) or the TAU/RAU request procedure (transmission of the TAU request message) therefor. In this case, when the service request procedure or the TAU procedure starts, new RRC establishment factor values, new call types, or service types (for each application group/category/priority information/ID) are defined to be transmitted to the AS(RRC) layer. In this case, the new RRC establishment factor values, the new call types, or the service types are used independently (only alone) or may be defined and used in combination.

In the case where the application-related information+application ID/information/indication received from the application layer is multiple or changed in the NAS recovery process, i) Based on the highest application-related information, when the service request procedure (transmission of SERVICE REQUEST message or transmission of EXTENDED SERVICE REQUEST message) or the TAU/RAU request procedure starts, new RRC establishment factor values, new call types, or service types (for each application group/category/priority information/ID) are defined to be provided to the AS(RRC) layer. (In this case, the new RRC establishment factor values, the new call types, or the service types are used independently (only alone) or may be defined and used in combination);

ii) Based on the lowest application-related information, when the service request procedure (transmission of SERVICE REQUEST message or transmission of EXTENDED SERVICE REQUEST message) or the TAU/RAU request procedure starts, new RRC establishment factor values, new call types, or service types (for each application group/category/priority information/ID) are defined to be provided to the AS(RRC) layer. (In this case, the new RRC establishment factor values, the new call types, or the service types are used independently (only alone) or may be defined and used in combination); or The schemes i) and ii) are recognized and determined by the NAS layer, and in this case, one of the schemes i) and ii) may be implemented and operated by network configuration/policy, UE capability, and the like.

In the case of receiving additionally (alternatively, separately) setting/start indication/information from the application layer, when the ACB is applied to the current (UE), the NAS layer ignores the barring state and starts/performs the service request procedure or the TAU procedure for the application service access. When the service request procedure or the TAU procedure starts, new RRC establishment factor values, new call types, or service types (for each application group/category/priority information/ID) are defined to be transmitted to the AS(RRC) layer. When receiving ACB skipping Stop/Reset indication information from the application layer, thereafter, an existing general service request procedure or TAU/RAU request procedure for the application service access is performed. That is, the existing service request procedure or TAU/RAU request procedure in which the new RRC establishment factor values, the new call types, or the service types for each application group/category/priority information/IDs are not defined is performed.

(step 5) When the service request procedure or the TAU procedure fro the application service access of the NAS layer starts, in the case of receiving the application-related information+application ID/information/indication from the NAS layer, the AS(RRC) layer performs the ACDC check for each application group/category/priority information/ID based on the ACDC configuration information (that is, the information including barring rates, barring factor, mean barring time, ACB skipping information, and the like for each application group/category/priority information/ID).

When the ACDC is passed for each application group/category/priority information/ID, the RRC connection request procedure fro the application service access is performed. However, when the ACDC is not passed (barred) for each application group/category/priority information/ID, the RRC connection request procedure fro the application service access is not performed.

In the case where the application-related information+application ID/information/indication received from the NAS layer is multiple or changed in the NAS recovery process, as described above, whether the application service access (the service request procedure or the TAU/RAU request procedure) attempt is allowed or not is determined, by using the highest application-related information or ii) the lowest application-related information.

When the service request procedure or the TAU procedure for the application service access of the NAS layer starts, if new RRC establishment factor values, new call types, or service types (for each application group/category/priority information/ID are defined to be provided from the NAS layer together, the ACDC is performed for each application group/category/priority information/ID based on the ACDC configuration information (that is, the information including barring rates, barring factor, mean barring time, ACB skipping information, and the like for each application group/category/priority information/ID) received from the network (for example, the base station).

When the ACDC is passed for each application group/category/priority information/ID, the RRC connection request procedure fro the application service access is performed. However, when the ACDC is not passed (barred) for each application group/category/priority information/ID, the RRC connection request procedure fro the application service access is not performed.

In the case of additionally (alternatively, separately) receiving the ACB skipping indication information from the NAS layer (in the case where the ACB skipping indication information is ACB skip-ON, SET or TRUE for group/category/priority "X"), the application service access (the service request procedure or the TAU procedure) attempt is allowed by skipping the ACB regardless of the current ACB state. (That is, the current barring state is ignored and the service request procedure or the TAU procedure starts/is performed to perform the RRC connection establishment.)

In this specification, when a change/variation (for example, from ACB skipping set/true to ACB skipping reset/false (from ACB skipping to No ACB skipping) or from ACB skipping reset/false to ACB skipping set/true (from No ACB skipping to ACB skipping)) in the ACB skipping information state for each application group/category/priority information/ID from the network (eNB) occurs (the occurrence is sensed), the AS(RRC) layer may immediately notify the change/variation in the ACB skipping configuration information to the application layer or the NAS layer (alternatively, the application layer and the NAS layer).

Thereafter, the application layer performs steps 1 to 3 according to the change/variation in the ACB skipping information state for each application group/category/priority information/ID.

In the case where the ACDC configuration information (that is, the information including barring rates, barring factor, mean barring time, roaming information, ACB skipping configuration, and the like for each application group/category/priority information/ID) and the general ACB information are simultaneously provided to the UE from the network (for example, the base station) through the SIB, the UE may skip the ACB check by applying the ACDC configuration information (that is, the information including barring rates, barring factor, mean barring time, roaming information, ACB skipping configuration, and the like for each application group/category/priority information/ID) (performs only the ACDC check).

If not, according to the indication/configuration from the network (MME/SGSN/base station or the like), the UE may skip the ACB check by selecting and applying one of the ACDC configuration information (that is, the information including barring rates, barring factor, mean barring time, roaming information, ACB skipping configuration, and the like for each application group/category/priority information/ID) of the present proposal and the general ACB information.

Alternatively, when the ACDC configuration information and the (existing) general ACB information are simultaneously provided from the network (for example, the base station) to the UE, the UE first performs the ACDC check in the application layer by applying only the ACDC configuration information, and if passing the ACDC check, the UE may perform the ACB by applying the existing general ACB information in the AS(RRC) layer again (that is, the UE performs both the ACDC check and the ACB check).

The contents described above may be applied even to the IMS-based application service. (That is, the IMS-based application service means one of general application group/category.)

The present proposal may be applied to both an IDLE mode and a CONNECTED mode of the UE. For example, the present proposal may be applied to either an EMM-IDLE/RRC-IDLE mode or an EMM-CONNECTED/RRC-CONNECTED mode.

If not, in the present proposal, the UE may also perform the ACDC check by differently applying the ACDC configuration information according to whether the UE is the IDLE mode or the CONNECTED mode (for example, the EMM-IDLE/RRC-IDLE mode or the EMM-CONNECTED/RRC-CONNECTED mode).

Step 0) of the present proposal may be applied by combining the proposals 1, 2, 4, 5a, 5b, 5c, and 5d of the present invention. Steps 1) to 3) of the present proposal may be applied by combining the proposals 1, 2, 4, 5a, 5b, 5c, and 5d of the present invention.

Meanwhile, the proposals 1a and 2 will be described according to expression of section D.1 of 3GPP standard document TS 24.301.

When the UE is configured for the ACDC, the NAS layer determines which ACDC category is applied for the request based on the application ID received from the higher layer. When one ACDC category is applied, the EMM sublayer may notify the ACDC category to the lower layer for the purpose of the access control, and when a plurality of ACDC categories is applied, the EMM sublayer may notify the ACDC category having the highest rank to the lower layer for the purpose of the access control. However, the following cases are excluded.

a case where in the selected PLMN, the UE uses AC11 to AC15 a case where the request responds to the paging.

Meanwhile, the proposals 1a and 2 will be described below according to expression of section 6.3 of 3GPP standard TS 36.331 document.

The base station transmits SIB type 2 including common radio resource configuration information to all the UEs. The SIB type 2 may include the following information.

TABLE 3

```
-- ASN1 START
[[         acdc-BarringForMO-Signalling-r13 per ACDC category         AC-BarringConfig
                   OPTIONAL,              -- Need OP
           acdc-BarringForMO-Data-r13 per ACDC category
           AC-BarringConfig                                            OPTIONAL         -- Need OP
]]
}
ACDC-BarringConfig ::=                                                 SEQUENCE {
    acdc-BarringFactor                                                 ENUMERATED {
    p00, p05, p10, p15, p20, p25, p30, p40,
    p50, p60, p70, p75, p80, p85, p90, p95},
    acdc-BarringTime
    ENUMERATED {s4, s8, s16, s32, s64, s128, s256, s512},
    acdc-BarringForSpecialAC                                           BIT
STRING(SIZE(5))
}
ACDC-BarringPerPLMN-r13 ::=                                            SEQUENCE {
    plmn-IdentityIndex-r13
    INTEGER(1..maxPLMN-r11),
    acdc-BarringInfo-r13                                                                SEQUENCE
{
           acdc-BarringForMO-Signalling-r13 per ACDC category          AC-
BarringConfig           OPTIONAL, -- Need OP
           acdc-BarringForMO-Data-r13 per ACDC category
```

TABLE 3-continued

| | | |
|---|---|---|
| AC-BarringConfig<br>} | OPTIONAL | -- Need OP |
| } | OPTIONAL, | -- Need OP |

Each field of the above Table will be described as follows

TABLE 4

Description of SIB type 2 field ac-BarringFactor
When a random value generated by the UE is smaller than a value of
ac-BarringFactor, access is allowed. If not, the access is barred.
acdc-BarringFactor
When the random value generated by the UE is smaller than a value of
acdc-BarringFactor, access is allowed. If not, the access is barred.
acdc-BarringForMO-Data per ACDC category
ACDC check for MO call per ACDC category
acdc-BarringForMO-Signalling per ACDC category
ACDC check for MO signaling per ACDC category
ACDC category
ACDC category (for example, ACDC Cat I, ACDC Cat II, . . . ,
ACDC Cat 128).
ac-BarringForSpecialAC
ACB check for ACs 11 to 15. The first/the leftmost bit is a bit for
AC11 and the second bit is a bit for AC 12.
acdc-BarringForSpecialAC
ACB check for ACs 11 to 15. The first/the leftmost bit is a bit for
AC11 and the second bit is a bit for AC 12.
ac-BarringTime
Mean access barring time (second)
acdc-BarringTime
Mean access barring time (second)

Meanwhile, the UE performs the RRC connection procedure according to a request of the higher layer. When performing the procedure, the UE 1> While the higher layer indicates the RRC connection request as an object of the ACDC check, in the case where the higher layer provides the ACDC category and the UE establishes the RRC connection for the MO call, 2> the UE performs the ACDC barring check for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC is applied to the MO call.

1> Meanwhile, while the higher layer indicates the RRC connection request as an object of the ACDC check, in the case where the higher layer provides the ACDC category and the UE establishes the RRC connection for the MO call, 2> the UE performs the ACDC barring check for each ACDC category by using Tyyy as Tbarring and acdc-BarringForMO-Signaling as an ACDC barring parameter.

2> In the case where the access is barred,

3> the UE notifies a failure of the RRC connection establishment to the higher layer and notifies that the ACDC is applied to the MO signaling.

Meanwhile, the UE performs the ACDC barring check as follows.

1> In the case where a timer T3xx or Tbarring is driving,

2> it is considered that the access to the corresponding cell is barred.

1> However, in the case where the SIB type 2 includes the ACDC barring parameter, 2> in the case where the UE stores one or more access classes 11 to 15 in the USIM, 2> with respect to at least one of available access classes, a corresponding bit of acdc-BarringForSpecialAC included in the ACDC barring parameter is set as 0.

3> It is considered that the access to the corresponding cell is not barred.

2> If not,

3> a random value rand which is evenly distributed to satisfy a range of 0≤rand<1 is generated.

3> In the case where the rand is smaller than the value indicated by acdc-BarringFactor included in the ACDC barring parameter, 4> it is considered that the access to the corresponding cell is not barred.

3> If not,

4> it is considered that the access to the corresponding cell is barred.

1> If not,

2> 2> it is considered that the access to the corresponding cell is barred.

1> In the case where the access to the corresponding cell is barred and the timers Txxx and Tbarring are not driving, 2> a random value rand which is evenly distributed to satisfy a range of 0≤rand<1 is generated.

2> The timer Tbarring set as a timer value calculated as follows is driven by using acdc-BarringTime in the ACDC barring parameter.

"Tbarring"=(0.7+0.6*rand)*acdc-BarringTime.

Meanwhile, the proposals 1b and 2 will be described below according to expression of section D.1 of 3GPP standard document TS 24.301.

When the EMM sublayer requests the establishment of the NAS signaling access, the RRC establishment factor used by the UE is selected according to the NAS procedure. The EMM sublayer notifies a call type related with the RRC connection establishment factor to the lower layer for the purpose of the access control. When the UE is configured for ExtendedAccessBarring (EAB), the EMM sublayer notifies that the EAB is applied to the request to the lower layer for the purpose of the access control. However, the following cases may be excluded.

a case where in the selected PLMN, the UE uses AC11 to AC15 a case where the request responds to the paging a case where the RRC establishment factor is set as "emergency call"

a case where the UE is configured to override an NAS signaling low priority and configured to override the EAB, a case where the UE is configured to override the NAS signaling low priority and configured to override the EAB, and a case where the UE overrides the EAB in advance and has the established PDN connection

TABLE 5

| NAS procedure | RRC establishment factor | Call type |
|---|---|---|
| Tracking Area Update | In the case where the UE does not have the PDN connection established for an emergency bearer service and does not start the PDN connection request having the request type set as "emergency", and in the case where the UE triggers for MO ACDC category 1, the RRC establishment factor is set as MO signaling. | "originating ACDC Cat I" |
| | In the case where the UE does not have the PDN connection established for the emergency bearer service and does not start the PDN connection request having the request type set as "emergency", and in the case where the UE triggers for MO ACDC category II, the RRC establishment factor is set as MO signaling. | "originating ACDC Cat II" |
| | In the case where the UE does not have the PDN connection established for the emergency bearer service and does not start the PDN connection request having the request type set as "emergency", and in the case where the UE triggers for MO ACDC category III, the RRC establishment factor is set as MO signaling. | "originating ACDC Cat III" |
| | In the case where the UE does not have the PDN connection established for the emergency bearer service and does not start the PDN connection request having the request type set as "emergency", and in the case where the UE triggers for MO ACDC category IV, the RRC establishment factor is set as MO signaling. | "originating ACDC Cat IV" |
| | In the case where the UE does not have the PDN connection established for an emergency bearer service and does not start the PDN connection request having the request type configured as "emergency", and in the case where the UE triggers for MO ACDC category V, the RRC establishment factor is set as MO signaling. | "originating ACDC Cat V" |
| Service Request | In the case where the service request is to request a radio resource of a user plane, an MO MMTEL voice call is not started, an MO MMTEL video call is not started, and MO SMSoIP is not started, the RRC establishment factor is set as MO data. | "originating calls" |
| | In the case where the service request procedure is to request the radio resource of the user plane and triggered for MO ACDC category I, the RRC establishment factor is set as MO data. | "originating ACDC Cat I" |
| | In the case where the service request procedure is to request the radio resource of the user plane and triggered for MO ACDC category II, the RRC establishment factor is set as MO data. | "originating ACDC Cat II" |
| | In the case where the service request procedure is to request the radio resource of the user plane and triggered for MO ACDC category III, the RRC establishment factor is set as MO data. | "originating ACDC Cat III" |
| | In the case where the service request procedure is to request the radio resource of the user plane and triggered for MO ACDC category IV, the RRC establishment factor is set as MO data. | "originating ACDC Cat IV" |
| | In the case where the service request procedure is to request a radio resource of a user plane and triggered for MO ACDC category V, the RRC establishment factor is set as MO data. | "originating ACDC Cat V" |

Meanwhile, the proposals 1b and 2 will be described below according to expression of section 6.3 of 3GPP standard TS 36.331 document.

The base station transmits SIB type 2 including common radio resource configuration information to all the UEs. The SIB type 2 may include the following information.

TABLE 6

```
[[                    acdc-BarringForMO-Signalling-r13 per ACDC category      AC-BarringConfig
                                  OPTIONAL,    -- Need OP
                      acdc-BarringForMO-Data-r13 per ACDC category
      AC-BarringConfig                OPTIONAL    -- Need OP
]]
}
ACDC-BarringConfig ::=                                  SEQUENCE {
                      acdc-BarringFactor                ENUMERATED {
                      p00, p05, p10, p15, p20, p25, p30, p40,
                      p50, p60, p70, p75, p80, p85, p90, p95},
                      acdc-BarringTime                              ENUMERATED
      {s4, s8, s16, s32, s64, s128, s256, s512},
                      acdc-BarringForSpecialAC          BIT STRING(SIZE(5))
}
ACDC-BarringPerPLMN-r13 ::=                 SEQUENCE {
                      plmn-IdentityIndex-r13            INTEGER(1..maxPLMN-
r11),
                      acdc-BarringInfo-r13                            SEQUENCE {
                        acdc-BarringForMO-Signalling-r13 per ACDC category      AC-BarringConfig
      OPTIONAL,         -- Need OP
                        acdc-BarringForMO-Data-r13 per ACDC category
      AC-BarringConfig OPTIONAL    -- Need OP
                      }
                                          OPTIONAL,    -- Need OP
}
```

Each field of the above Table will be described as follows.

TABLE 7

Description of SIB type 2 field ac-BarringFactor
When a random value generated by the UE is smaller than a value of ac-BarringFactor, access is allowed. If not, the access is barred.
acdc-BarringFactor
When the random value generated by the UE is smaller than a value of acdc-BarringFactor, access is allowed. If not, the access is barred.
acdc-BarringForMO-Data per ACDC category
ACDC check for MO call per ACDC category
acdc-BarringForMO-Signalling per ACDC category
ACDC check for MO signaling per ACDC category
ACDC category
ACDC category (for example, ACDC Cat I, ACDC Cat II, . . . , ACDC Cat 128).
ac-BarringForSpecialAC
ACB check for ACs 11 to 15. The first/the leftmost bit is a bit for AC11 and the second bit is a bit for AC 12.
acdc-BarringForSpecialAC
ACB check for ACs 11 to 15. The first/the leftmost bit is a bit for AC11 and the second bit is a bit for AC 12.
ac-BarringTime
Mean access barring time (second)
acdc-BarringTime
Mean access barring time (second)

Meanwhile, the UE performs the RRC connection procedure according to a request of the higher layer. When performing the procedure, the UE 1> While the higher layer indicates the RRC connection request as an object of the ACDC check, in the case where the higher layer provides the ACDC category and the UE tries to establish the RRC connection for the MO with respect to ADCD category I (categories II, III, . . . ), 2> the ACDC barring check is performed for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the higher layer provides the ACDC category and the UE tries to establish the RRC connection for the MO with respect to ADCD category I (categories II, III, . . . ), 2> the UE performs the ACDC barring check for each ACDC category by using Tyyy as Tbarring and acdc-BarringForMO-Signaling as an ACDC barring parameter.

2> In the case where the access is barred,

3> the UE notifies a failure of the RRC connection establishment to the higher layer and notifies that the ACDC is applied to the MO signaling.

Meanwhile, the UE performs the ACDC barring check as follows.

1> In the case where a timer T3xx or Tbarring is driving,

2> it is considered that the access to the corresponding cell is barred.

1> However, in the case where the SIB type 2 includes the ACDC barring parameter, 2> in the case where the UE stores one or more access classes 11 to 15 in the USIM, 2> with respect to at least one of available access classes, a corresponding bit of acdc-BarringForSpecialAC included in the ACDC barring parameter is set as 0.

3> It is considered that the access to the corresponding cell is not barred.

2> If not,

3> a random value rand which is evenly distributed to satisfy a range of 0≤rand<1 is generated.

3> In the case where the rand is smaller than the value indicated by acdc-BarringFactor included in the ACDC barring parameter, 4> it is considered that the access to the corresponding cell is not barred.

3> If not,

4> it is considered that the access to the corresponding cell is barred.

1> If not,

2> 2> it is considered that the access to the corresponding cell is barred;

1> In the case where the access to the corresponding cell is barred and the timers Txxx and Tbarring are not driving, 2> a random value rand which is evenly distributed to satisfy a range of 0≤rand<1 is generated.

2> The timer Tbarring set as a timer value calculated as follows is driven by using acdc-BarringTime in the ACDC barring parameter.

"Tbarring"=(0.7+0.6*rand)*acdc-BarringTime.

Meanwhile, the proposals 1c and 2 will be described below according to expression of section 5.3.3.2 of 3GPP standard document TS 36.331.

When the UE performs the RRC connection procedure according to the request of the higher layer, in the case where the UE 1> provides the application group/category/priority/ID/information and the UE tries to establish the RRC connection for the MO call while the higher layer indicates the RRC connection request as an object of the ACDC check, 2> the UE determines the highest or lowest ACDC category based on the ACDC configuration information.

2> the ACDC barring check is performed for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> Meanwhile, in the case where the UE provides the application group/category/priority/ID/information and the UE tries to establish the RRC connection for the MO signaling while the higher layer indicates the RRC connection request as an object of the ACDC check, 2> the UE determines the highest or lowest ACDC category based on the ACDC configuration information.

2> the UE performs the ACDC barring check for each ACDC category by using Tyyy as Tbarring and acdc-BarringForMO-Signaling as an ACDC barring parameter.

2> In the case where the access is barred,

3> the UE notifies a failure of the RRC connection establishment to the higher layer and notifies that the ACDC for the MO signaling is applied.

III. Proposal 3 of the Present Invention (Proposal 2 Disclosed in Provisional Application)

According to the proposal 3 of the present invention, the application layer of the UE may perform the ACDC check. The proposal 3 is divided into proposals 3a, 3b, 3c, and 3d. The proposal 3 will be described in detail with reference to the accompanying drawings.

Figure 12:
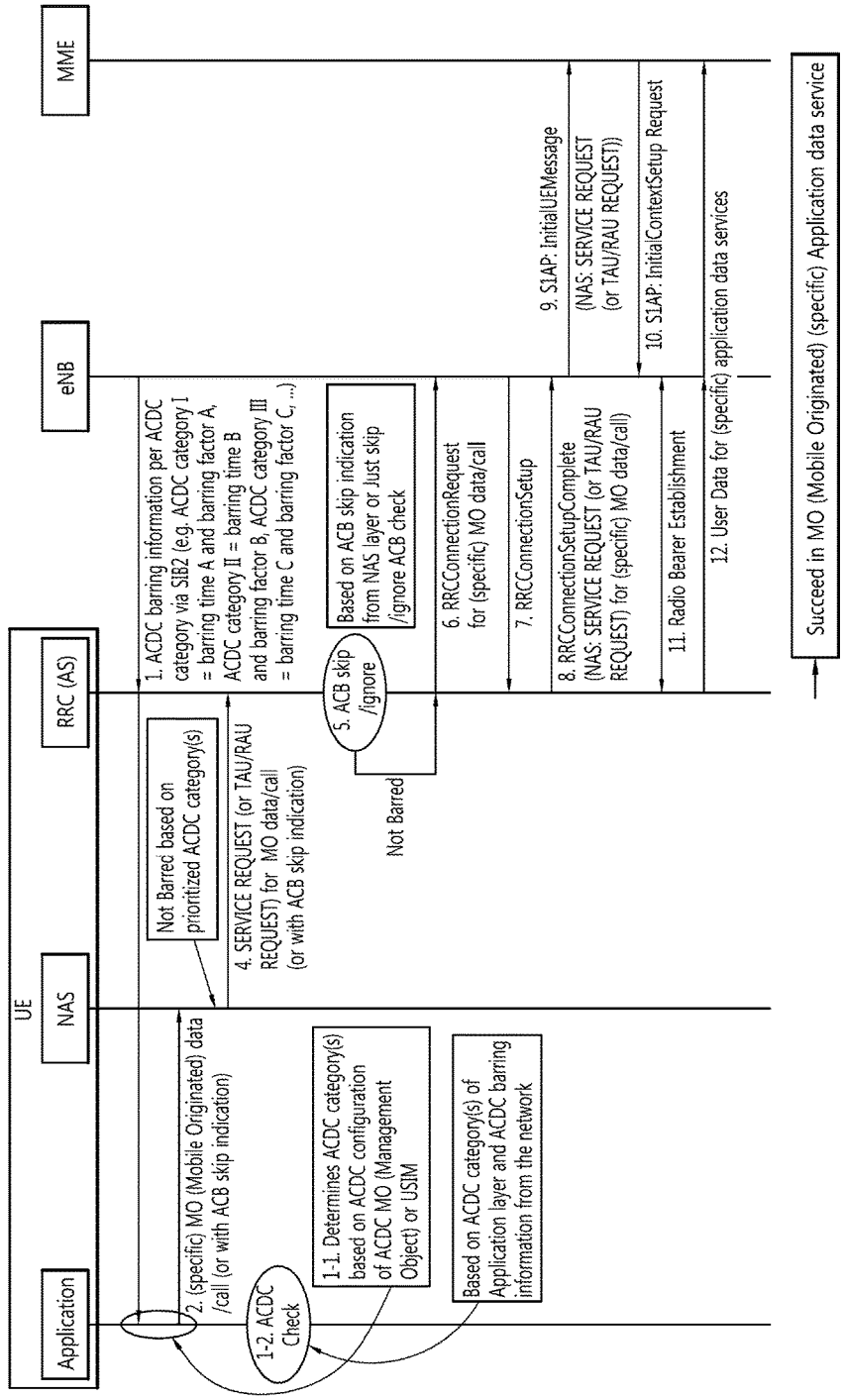
FIG. 12 is a flowchart according to a proposal 3a of the present invention.

FIG. 12 is a flowchart according to a proposal 3a of the present invention.

(step 0) A network (provider) provides (alternatively, configures) application-related information (that is, application group/category/priority information/ID) to the UE. The application-related information is provided to the UE through an application management object (MO) (for example, an (access control) MO per application) according to OMA DM or (pre)configured in the USIM to be provided to the UE. The NAS layer or the application layer of the UE or an application control layer including an operating system (OS) or the AS(RRC) layer may obtain application group/category/priority information/IDs through AT-command and the like.

The application-related information (that is, the application group/category/priority information/ID) may be provided to the UE periodically or at a specific time from the network (provider).

(step 1) The network (for example, the base station) may provide ACDC configuration information (that is, information including barring rates, barring factor, mean barring time, roaming information, ACB skipping configuration, and the like for each application group/category/priority information/ID) to the AS(RRC) layer of the UE through the SIB.

The AS(RRC) layer provides the ACDC configuration information to the application layer. That is, the application layer receives the information from the AS(RRC) layer. For example, when an application data service (an IP-based data service, for example, Internet, GoogleMap, KaTalk, etc) starts, the application layer requests the information provision to the AS(RRC) layer to receive the requested information.

(Step 1-1) The application layer determines an application category for the ACDC, based on the obtained application-related information (that is, the application group/category/priority information/ID).

(Step 1-2) When the application data service starts, based on the application-related information (that is, the application group/category/priority information/ID) obtained in step 0), whether the IP-based application service access attempt is allowed or not is determined by using the ACDC configuration information (that is, the related information including barring rates, barring factor, mean barring time, roaming information, and the like for each application group/category/priority information/ID) received from the AS(RRC) layer.

When the IP-based application service access attempt is allowed, the application service starts in the application layer as it is and service section access to the network will be progressed, and when the application service access attempt is not allowed, the application service section access to the network will be not attempted at all.

In the case where the ACDC configuration information (that is, information including barring rates, barring factor, mean barring time, roaming information, ACB skipping configuration, and the like for each application group/category/priority information/ID) and the (existing) general ACB information are simultaneously provided from the network (for example, the base station) to the UE through the SIB, the UE may perform ACB check skipping by only the ACDC configuration information and the information including the ACB skipping configuration and the like.

(Step 2) When the access attempt is not barred but allowed, the indication/information for the ACB skipping is additionally provided/transferred to the NAS layer (alternatively, the RRC layer).

(Step 4) When the access attempt is allowed, the NAS layer performs a service request procedure or a TAU procedure for the IP-based application service access.

Meanwhile, in the case where the access attempt is allowed and the indication/information for the general ACB skipping is additionally provided from the application layer together, the NAS layer may provide/transfer ACB skipping indication/information to the AS(RRC) layer when the service request procedure or the TAU/RAU procedure starts.

(step 5) Meanwhile, the AS(RRC) layer may additionally perform the ACB check. In this case, whether the service request procedure or the TAU/RAU procedure is allowed or not is determined based on the ACB information received from the network (for example, the base station) by performing the ACB check. When passing the ACB check, the AS(RRC) layer performs an RRC connection request procedure.

Meanwhile, when the service request procedure or the TAU/RAU procedure of the NAS layer starts, in the case where the skipping indication/information is additionally provided/transferred, the AS(RRC) layer does not perform the ACB check.

Alternatively, when the ACDC check is passed, the AS(RRC) layer ignores/does not perform the general ACB check and immediately performs the RRC connection establishment procedure.

Figure 13:
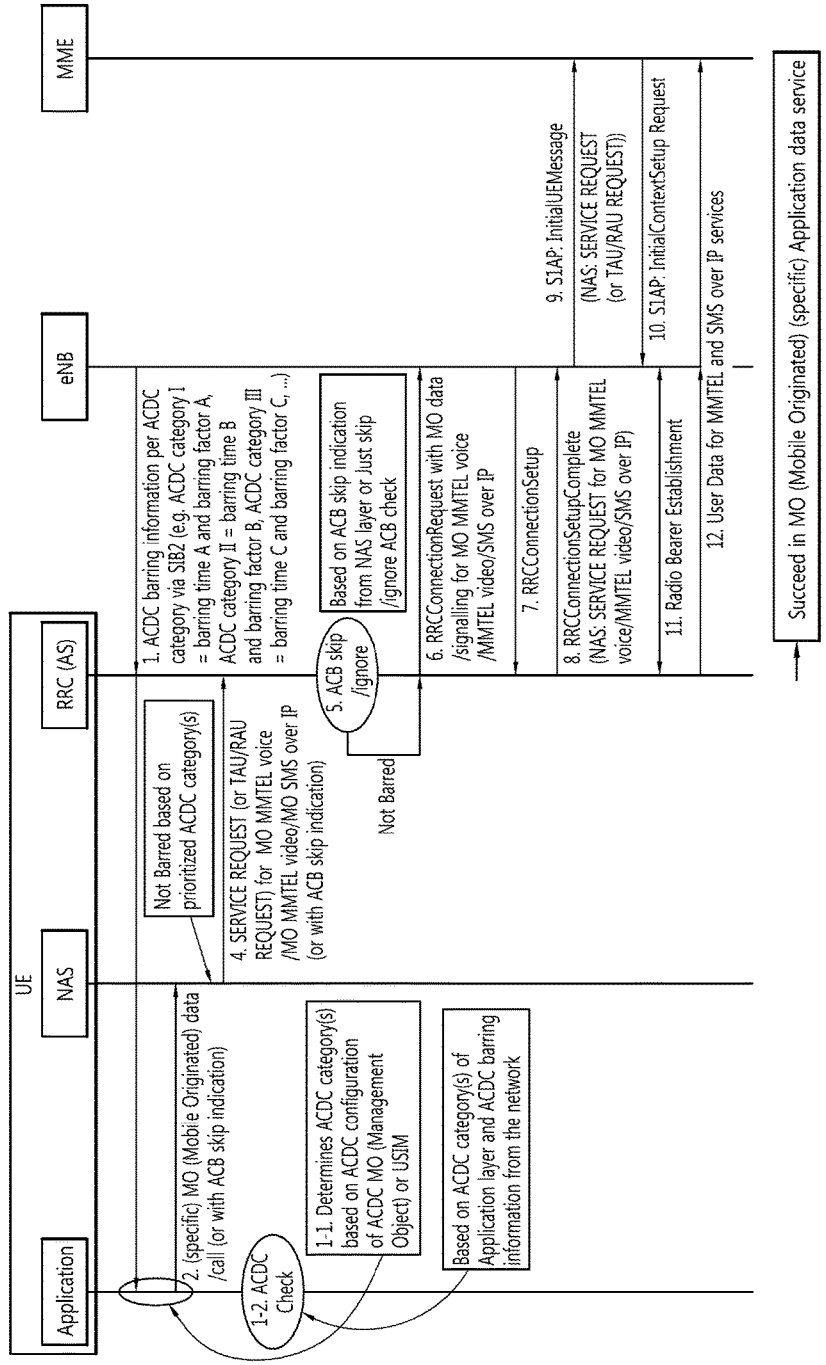
FIG. 13 is a flowchart according to a proposal 3b of the present invention.

FIG. 13 is a flowchart according to a proposal 3b of the present invention.

The proposal 3b illustrated in FIG. 13 is different from the proposal 3a illustrated in FIG. 12 only in a few points. Hereinafter, different parts will be mainly described.

(step 1) When an IMS layer starts a data communication service, the IMS layer receives application-related information (that is, application group/category information/ID) from the AS (RRC) layer. In this case, when the IMS service (for example, MMTEL voice, MMTEL video, SMS over IP service) starts, the IMS layer requests the information provision to the AS (RRC) layer to receive the requested information, and if not, the information may be received without the request for the information provision.

(step 1-2) When the IMS-based application service starts, based on the obtained application-related information, whether the IMS-based application access attempt is allowed or not is determined by using the ACDC configuration information (information including barring rates, barring factor, mean barring time, roaming information, and the like provided for each application group/category/priority information/ID) received from the AS(RRC) layer. When the IMS-based application service access attempt is allowed, the application service starts in the application layer as it is and service section access to the network will be progressed, and when the application service access attempt is not allowed, the application service section access to the network will be not attempted at all.

In the case where the ACDC configuration information (that is, the information including barring rates, barring factor, mean barring time, roaming information, ACB skipping configuration, and the like for each application group/category/priority information/ID) and the general ACB information are simultaneously provided from the network (for example, the base station) to the UE through the SIB, the UE performs only the ACDC check based on the ACDC configuration information and may perform the ACB skipping.

To this end, when the IMS-based application service access attempt is allowed (not barred), the IMS layer may additionally provide/transfer indication/information for ACB skipping to the NAS layer (alternatively, the RRC layer).

(step 5) The AS(RRC) layer may additionally perform the ACB check after the ACDC check is performed. In this case, the ACB check may be performed based on the ACB information received from the network (for example, the base station).

When the service request procedure or the TAU/RAU procedure of the NAS layer starts, in the case where the ACB skipping indication/information is additionally provided/transferred, the AS(RRC) layer does not perform the ACB check. Thereafter, the AS(RRC) layer performs the RRC connection request procedure.

Alternatively, when the ACDC check is passed, the AS(RRC) layer ignores/does not perform the ACB check and immediately performs the RRC connection establishment procedure.

Figure 14:
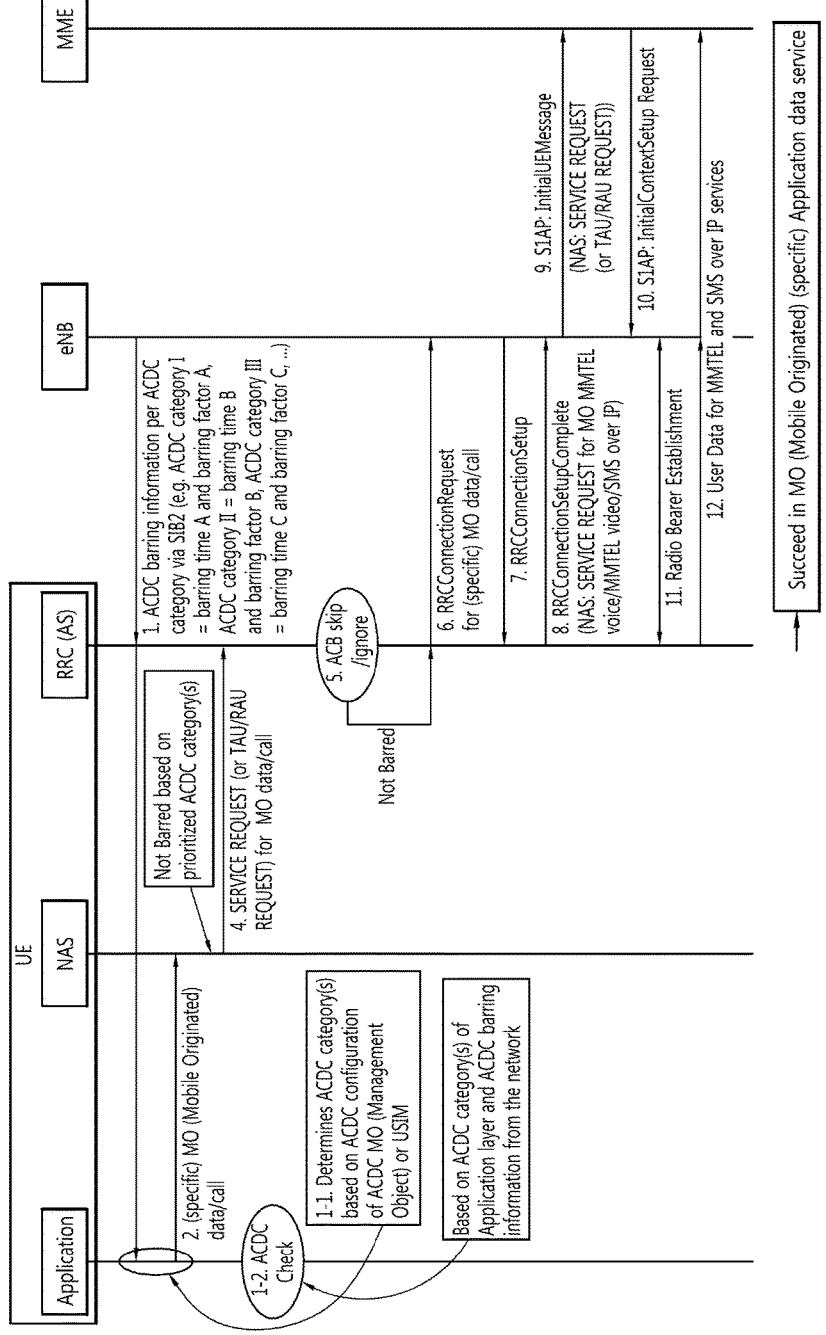
FIG. 14 is a flowchart according to a proposal 3c of the present invention.

FIG. 14 is a flowchart according to a proposal 3c of the present invention.

The proposal 3c illustrated in FIG. 14 is different from the proposals 3a and 3b only in a few points. Hereinafter, different parts will be mainly described.

After the application layer performs the ACDC check, when the access attempt is allowed (not barred), the AS(RRC) layer may pass the ACB check even though the AS(RRC) layer does not receive the indication/information for ACB skipping.

Figure 15:
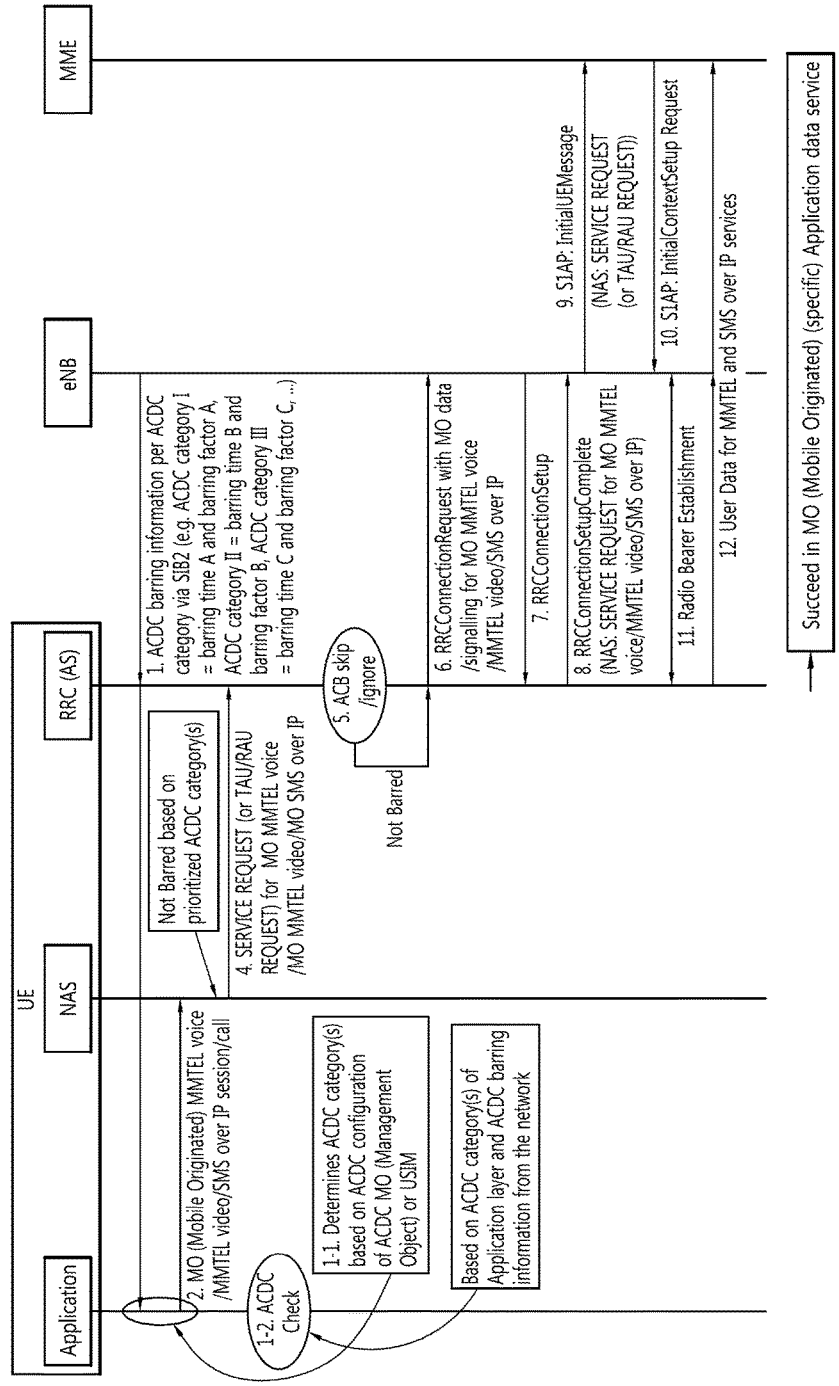
FIG. 15 is a flowchart according to a proposal 3d of the present invention.

FIG. 15 is a flowchart according to a proposal 3d of the present invention.

The proposal 3d illustrated in FIG. 15 is different from the proposals 3a, 3b, and 3c only in a few points. Hereinafter, different parts will be mainly described.

After the IMS layer performs the ACDC check, when the access attempt is allowed (not barred), the AS(RRC) layer may pass the ACB check even though the AS(RRC) layer does not receive the indication/information for ACB skipping.

IV. Proposal 4 of the Present Invention

The proposal 4 is similar to those illustrated in FIGS. 12 to 15. Accordingly, the proposal 4 will be described with reference to FIGS. 12 to 15 as it is without referring to a separate drawing.

(step 1) The network (for example, the base station) provides ACDC configuration information (that is, the information including barring rates, barring factor, mean barring time, ACB skipping information, and the like for each application group/category/priority information/ID) to the UE through SIB. The information may be received from the network by the AS(RRC) layer of the UE. Then, the AS(RRC) layer may provide the information to the application layer (alternatively, the NAS layer). For example, when the application layer starts the data communication service, the application layer requests the provision of the information to the AS(RRC) layer to receive the requested information.

(step 1-2) In the case where the application layer receives the ACDC configuration information from the AS(RRC) layer, the application layer determines whether the service request procedure or the TAU procedure access attempt for the application service access of the NAS layer is allowed or not, based on the information. That is, the application layer performs the ACDC check based on the ACDC configuration information received from the AS(RRC) layer to determine whether the service access attempt for providing the application service is allowed or not.

When the application layer does not allow the access attempt, the application layer does not request starting of the application service (MO data or MO signaling) to the NAS layer. As a result, the service connection of the application is barred.

(step 2) When the access attempt is allowed, the application layer requests starting of the application service (MO data or MO signaling). In this case, when receiving the ACB skipping indication information (for example, the ACB skipping indication information is ACB skip-ON, SET or TRUE for group/category/priority "X") from the AS(RRC) layer, the application layer transmits the ACB skipping indication to the NAS layer.

(Step 4) The NAS layer performs the service request procedure or the TAU procedure when receiving the request for the starting of the application service (MO data or MO signaling) from the application layer.

In the case of receiving the ACB skipping indication, for example, the skip Stop/Reset indication information from the application layer, the NAS layer transmits only the application-related information (that is, the application group/category/priority information/ID) to the AS(RRC) layer when the service request procedure or the TAU procedure for the application service access starts and may not transmit the ACB skipping indication based on the application-related information (that is, the application group/category/priority information/ID).

Alternatively, the application layer may transmit the application-related information (that is, the application group/category/priority information/ID)+the ACB skipping indication (for example, ACB skip-OFF, RESET or FALSE for group/category/priority "Y") based on the application-related information to the AS(RRC) layer.

In the case of receiving additionally ACB skipping Start/Set indication information from the application layer, when the current ACB is applied, the NAS layer ignores the barring state and starts/performs the service request procedure or the TAU procedure for the application service access. When the service request procedure or the TAU procedure starts, the application-related information (that is, the application group/category/priority information/ID)+the ACB skipping indication (for example, ACB skip-ON, SET or TRUE for group/category/priority "X") is transmitted to the AS(RRC) layer.

(step 5) The AS(RRC) layer performs the RRC access request procedure when the service request procedure or the TAU procedure for the application service access starts.

In the case of receiving the ACB information from the network, the AS(RRC) layer performs the ACB check when the received service request procedure or TAU procedure for the application service access of the NAS layer starts to determine whether the final application service access (the service request procedure or the TAU procedure) attempt is allowed or not.

Alternatively, when the ACDC check is passed, the ACB check is not performed, but the RRC connection request procedure is performed.

In the case of receiving the ACB skipping indication information (for example, the ACB skipping indication information is ACB skip-ON, SET or TRUE for group/category/priority "X) from the NAS layer, the AS(RRC) layer allows the access attempt by skipping the ACB regardless of the current ACB state. That is, the current barred state is ignored, and the AS(RRC) layer may establish the RRC connection by starting/performing the service request procedure or the TAU procedure.

Meanwhile, when a change/variation (for example, from ACB skipping set/true to ACB skipping reset/false (from ACB skipping to No ACB skipping) or from ACB skipping reset/false to ACB skipping set/true (from No ACB skipping to ACB skipping)) in the ACB skipping information state per application-related information (that is, application group/ category/priority information/ID) provided from the network (eNB) occurs (the occurrence is sensed), the AS(RRC) layer may notify the change/variation in the ACB skipping configuration information to the application layer or the NAS layer (alternatively, the application layer and the NAS layer).

Thereafter, the application layer performs the aforementioned steps again according to the change/variation in the ACB skipping information state per application-related information (that is, application group/category/priority information/ID).

On the other hand, when the ACDC configuration information and the ACB information are simultaneously received from the network (for example, the base station) through the SIB, the UE performs only the ACDC check based on the ACDC configuration information and may skip the ACB check. If not, according to indication/configuration from the network (MME/SGSN/base station and the like), the UE performs only the ACDC check or may perform only the ACB check by selecting and applying one of the ACDC configuration information and the ACB information.

Alternatively, when the ACDC configuration information and the ACB information are simultaneously received from the network (for example, the base station) through the SIB, the UE performs the ACDC check based on the ACDC configuration information and may perform the ACB check based on the ACB information in the AS(RRC) layer when the ACDC check is passed.

The operation of the application layer described in the proposal 4 may be applied to the IMS layer.

The proposal 4 may be applied to both an IDLE mode and a CONNECTED mode of the UE. For example, the proposal 4 may be applied to an EMM-IDLE/RRC-IDLE mode or an EMM-CONNECTED/RRC-CONNECTED mode.

Alternatively, the ACDC configuration information may be differently applied according to whether the UE is the IDLE mode or the CONNECTED mode (for example, the EMM-IDLE/RRC-IDLE mode or the EMM-CONNECTED/RRC-CONNECTED mode).

V. Proposal 5 of the Present Invention

The proposal 5 proposes a processing method in the case of a plurality of application group/category/priority information/IDs. The proposal 5 may be classified into proposals 5a, 5b, 5c, and 5d. Hereinafter, the respective proposals will be described.

V-1. Proposal 5a

When the application-related information received from the application layer or the application-related information+ indication information such as Start/Stop or Set/Reset is multiple or the application group/category/priority information/ID is changed (unlike the previous information) in an NAS recovery process, i) only the highest application-related information (that is, the application group/category/priority information/ID) is provided to the AS(RRC) layer;

i) only the lowest application-related information (that is, the application group/category/priority information/ID) is provided to the AS(RRC) layer;

iii) the multiple application-related information (that is, the application group/category/priority information/IDs) or the application-related information before and after change may be provided to the AS(RRC) layer.

The schemes i), ii) and iii) are recognized and determined by the NAS layer, and in this case, one of the schemes i), ii) and iii) may be implemented and operated by network configuration/policy, UE capability, and the like.

When the application-related information received from the application layer or the application-related information+ the indication information such as Start/Stop or Set/Reset is multiple or changed in an NAS recovery process, i) Based on the highest application-related information (that is, the application group/category/priority information/ID), when the service request procedure or the TAU/RAU request procedure starts, new RRC establishment factor values, new call types, or service types are defined to be transmitted to the AS(RRC) layer. (In this case, the new RRC establishment factor values, the new cal types, or the service types are used independently (only alone) or may be defined and used in combination);

i) Based on the lowest application-related information (that is, the application group/category/priority information/ID), when the service request procedure or the TAU/RAU request procedure starts, new RRC establishment factor values, new call types, or service types are defined to be transmitted to the AS(RRC) layer. (In this case, the new RRC establishment factor values, the new cal types, or the service types are used independently (only alone) or may be defined and used in combination); or The schemes i) and ii) are recognized and determined by the NAS layer, and in this case, one of the schemes i) and ii) may be implemented and operated by network configuration/policy, UE capability, and the like.

When the application-related information received from the application layer or the application-related information+ the indication information such as Start/Stop or Set/Reset is multiple or changed in an NAS recovery process, i) based on the highest application-related information (that is, the application group/category/priority information/ID), whether the application service access (the service request procedure or the TAU/RAU request procedure) attempt is allowed or not is determined by using the ACDC configuration information (information including barring rates, barring factor, mean barring time, roaming information, and the like provided for each application group/category/priority information/ID) received from the network; or ii) based on the lowest application-related information (that is, the application group/category/priority information/ID), whether the application service access (the service request procedure or the TAU/RAU request procedure) attempt is allowed or not is determined by using the ACDC configuration information (information including barring rates, barring factor, mean barring time, roaming information, and the like provided for each application group/category/priority information/ID) received from the network;

The schemes i) and ii) are recognized and determined by the AS(RRC) layer, and in this case, one of the schemes i) and ii) may be implemented and operated by network configuration/policy, UE capability, and the like.

When the application-related information or the application-related information+the indication information such as Start/Stop or Set/Reset received from the NAS layer is multiple, i) based on the highest application-related information (that is, the application group/category/priority information/ID), whether the application service access (the service request procedure or the TAU/RAU request procedure) attempt is allowed or not is determined by using the ACDC configuration information (information including barring rates, barring factor, mean barring time, roaming information, and the like provided for each application group/category/priority information/ID) received from the network; or ii) based on the lowest application-related information (that is, the application group/category/priority information/ID), whether the application service access (the service request procedure or the TAU/RAU request procedure) attempt is allowed or not is determined by using the ACDC configuration information (information including barring rates, barring factor, mean barring time, roaming information, and the like provided for each application group/category/priority information/ID) received from the network;

The schemes i) and ii) are recognized and determined by the AS(RRC) layer, and in this case, one of the schemes i) and ii) may be implemented and operated by network configuration/policy, UE capability, and the like.

V-2. Proposal 5b

In the case where the application-related information (that is, the application group/category/priority information/ID)+ the application ID/information/indication received from the application layer is multiple or changed in the NAS recovery process, i) only the highest application-related information (that is, the application group/category/priority information/ID)+the application ID/information/indication is provided to the AS(RRC) layer;

i) only the lowest application-related information (that is, the application group/category/priority information/ID)+the application ID/information/indication is provided to the AS(RRC) layer;

iii) the multiple application-related information (that is, the application group/category/priority information/ID+the application ID/information/indication) (the previous information and the changed information) may be provided to the AS(RRC) layer.

The schemes i), ii), and iii) are recognized and determined by the NAS layer, and in this case, one of the schemes i), ii), and iii) may be implemented and operated by network configuration/policy, UE capability, and the like.

In the case where the application-related information (that is, the application group/category/priority information/ID)+ the application ID/information/indication received from the application layer is multiple or changed in the NAS recovery process, i) based on the highest application-related information (that is, the application group/category/priority information/ID), when the service request procedure or the TAU/RAU request procedure starts, new RRC establishment factor values, new call types, or service types (for each application group/category/priority information/ID) are defined to be transmitted to the AS(RRC) layer. (In this case, the new RRC establishment factor values, the new cal types, or the service types are used independently (only alone) or may be defined and used in combination); or ii) based on the lowest application-related information (that is, the application group/category/priority information/ID), when the service request procedure or the TAU/RAU request procedure starts, new RRC establishment factor values, new call types, or service types (for each application group/category/priority information/ID) are defined to be transmitted to the AS(RRC) layer. (In this case, the new RRC establishment factor values, the new cal types, or the service types are used independently (only alone) or may be defined and used in combination);

the schemes i) and ii) are recognized and determined by the NAS layer, and in this case, one of the schemes i) and ii) may be implemented and operated by network configuration/policy, UE capability, and the like.

In the case where the application-related information (that is, the application group/category/priority information/ID)+ the application ID/information/indication received from the NAS layer is multiple or changed in the NAS recovery process, i) based on the highest application-related information (that is, the application group/category/priority information/ID), whether the application service access (the service request procedure or the TAU/RAU request procedure) attempt is allowed or not is determined by using the ACDC configuration information received from the network;

ii) based on the lowest application-related information (that is, the application group/category/priority information/ID), whether the application service access (the service request procedure or the TAU/RAU request procedure) attempt is allowed or not is determined by using the ACDC configuration information received from the network;

the schemes i) and ii) are recognized and determined by the AS(RRC) layer, and in this case, one of the schemes i) and ii) may be implemented and operated by network configuration/policy, UE capability, and the like.

In the case where the application-related information (that is, the application group/category/priority information/ID) received from the application layer is multiple or changed in the NAS recovery process, i) only the highest application-related information (that is, the application group/category/priority information/ID)+the application ID/information/indication is provided to the AS(RRC) layer; or ii) only the lowest application-related information (that is, the application group/category/priority information/ID)+the application ID/information/indication is provided to the AS(RRC) layer; or iii) the multiple application-related information (that is, the application group/category/priority information/ID+the application ID/information/indication) (the previous information and the changed information) may be provided to the AS(RRC) layer.

The schemes i), ii) and iii) are recognized and determined by the NAS layer, and in this case, one of the schemes i), ii) and iii) may be implemented and operated by network configuration/policy, UE capability, and the like.

In the case where the application-related information (that is, the application group/category/priority information/ID)+ the application ID/information/indication received from the application layer is multiple or changed unlike the previous information in the NAS recovery process, i) based on the highest application-related information (that is, the application group/category/priority information/ID), when the service request procedure or the TAU/RAU request procedure starts, new RRC establishment factor values, new call types, or service types (for each application group/category/priority information/ID) are defined to be transmitted to the AS(RRC) layer. (In this case, the new RRC establishment factor values, the new cal types, or the service types are used independently (only alone) or may be defined and used in combination); or ii) based on the lowest application-related information (that is, the application group/category/priority information/ID), when the service request procedure or the TAU/RAU request procedure starts, new RRC establishment factor values, new call types, or service types (for each application group/category/priority information/ID) are defined to be transmitted to the AS(RRC) layer. (In this case, the new RRC establishment factor values, the new cal types, or the service types are used independently (only alone) or may be defined and used in combination);

the schemes i) and ii) are recognized and determined by the NAS layer, and in this case, one of the schemes i) and ii) may be implemented and operated by network configuration/policy, UE capability, and the like.

In the case where the application-related information (that is, the application group/category/priority information/ID)+ the application ID/information/indication received from the NAS layer is multiple, i) based on the highest application-related information (that is, the application group/category/priority information/ID), whether the application service access (the service request procedure or the TAU/RAU request procedure) attempt is allowed or not is determined by using the ACDC configuration information received from the network;

ii) based on the lowest application-related information (that is, the application group/category/priority information/ID), whether the application service access (the service request procedure or the TAU/RAU request procedure) attempt is allowed or not is determined by using the ACDC configuration information received from the network;

the schemes i) and ii) are recognized and determined by the AS(RRC) layer, and in this case, one of the schemes i) and ii) may be implemented and operated by network configuration/policy, UE capability, and the like.

FIGS. 16 to 19 are exemplary diagrams illustrating a signal flow according to proposals 5a and 5b.

Figure 16:
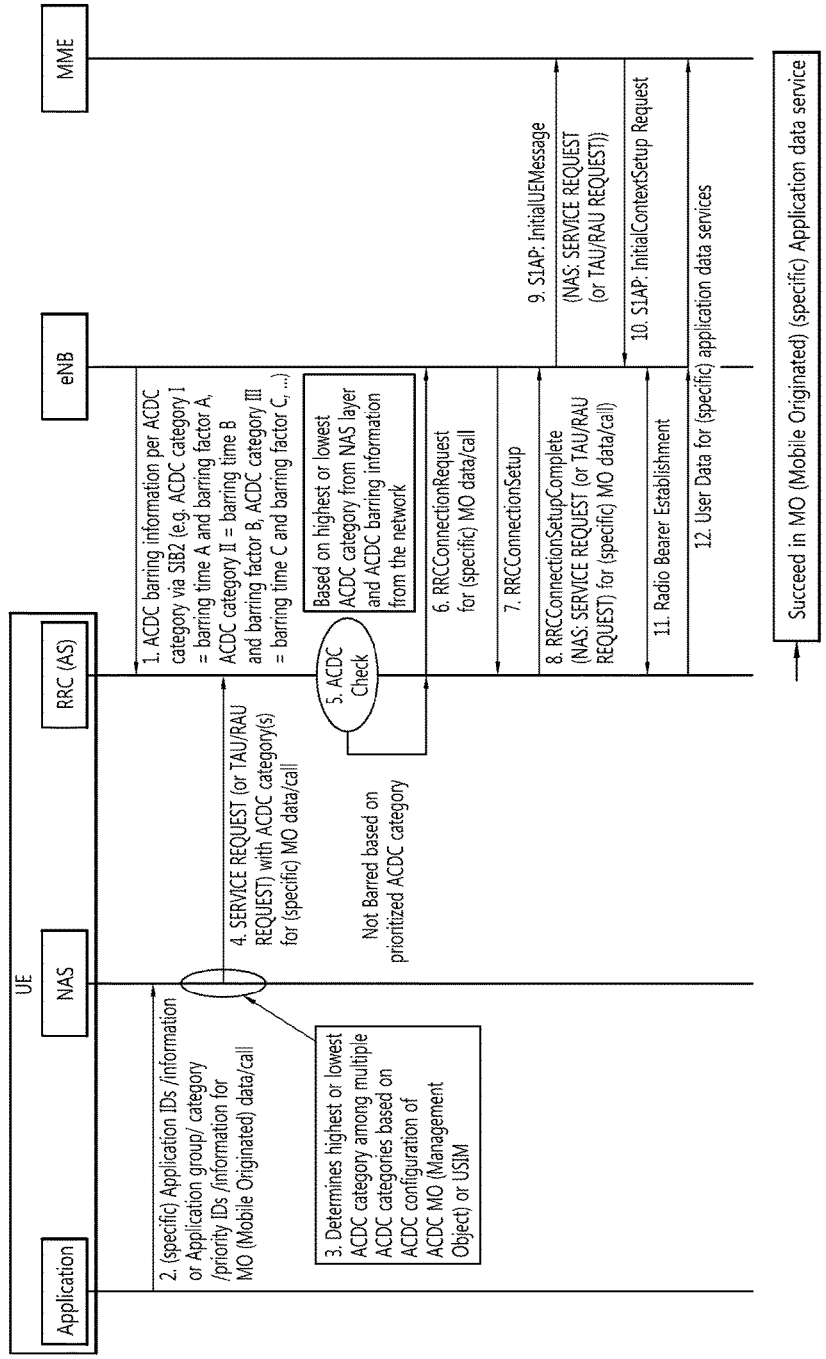
FIGS. 16 to 19 are exemplary diagrams illustrating a signal flow according to proposals 5a and 5b.

Referring to FIG. 16, the NAS layer of the UE selects the highest or lowest category among the ACDC categories based on the application-related information and requests a start of a service request procedure or a TAU/RAU procedure according to the selected category. Then, the AS(RRC) layer of the UE performs the ACDC check based on the selected highest or lowest category.

Figure 17:
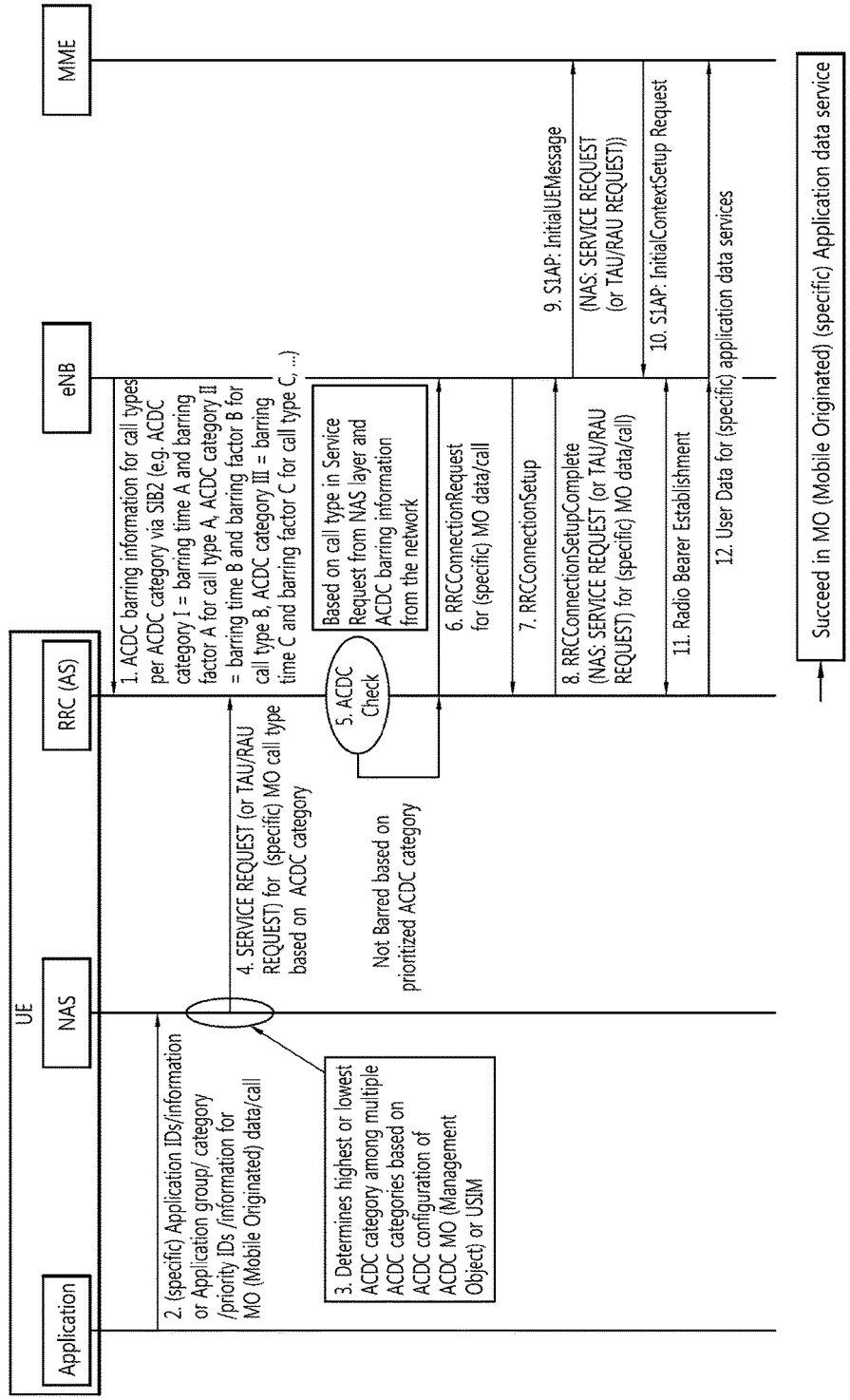

Referring to FIG. 17, the NAS layer of the UE selects the highest or lowest category among the ACDC categories based on the application-related information and requests a start of a service request procedure or a TAU/RAU procedure having a call type according to the selected category. Then, the AS(RRC) layer of the UE performs the ACDC check based on the (selected) call type.

Figure 18:
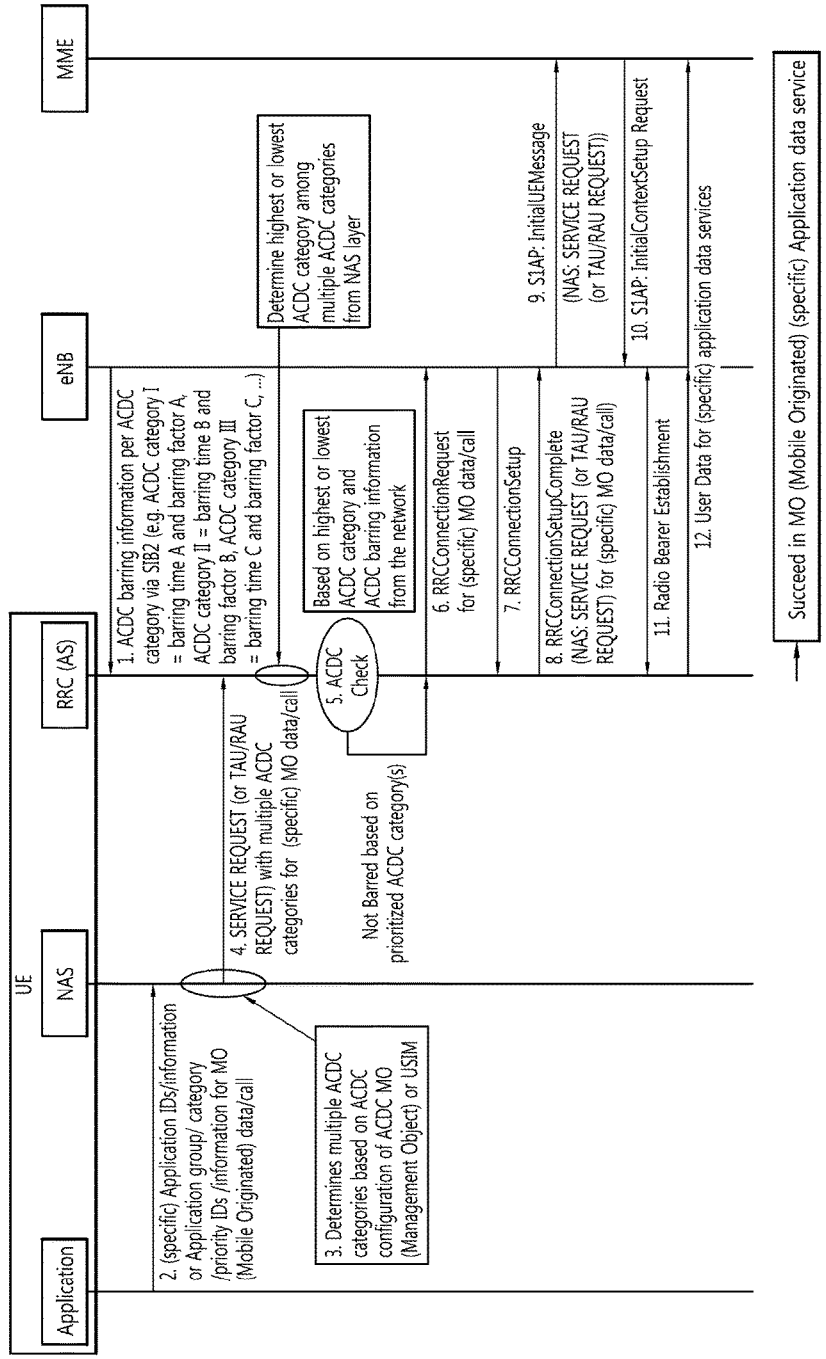

Referring to FIG. 18, the NAS layer of the UE selects a plurality of categories based on the application-related information and requests a start of a service request procedure or a TAU/RAU procedure according to the selected categories. Then, the AS(RRC) layer of the UE selects/determines the highest or lowest category among the plurality of categories and performs the ACDC check based on the selected highest or lowest category.

Figure 19:
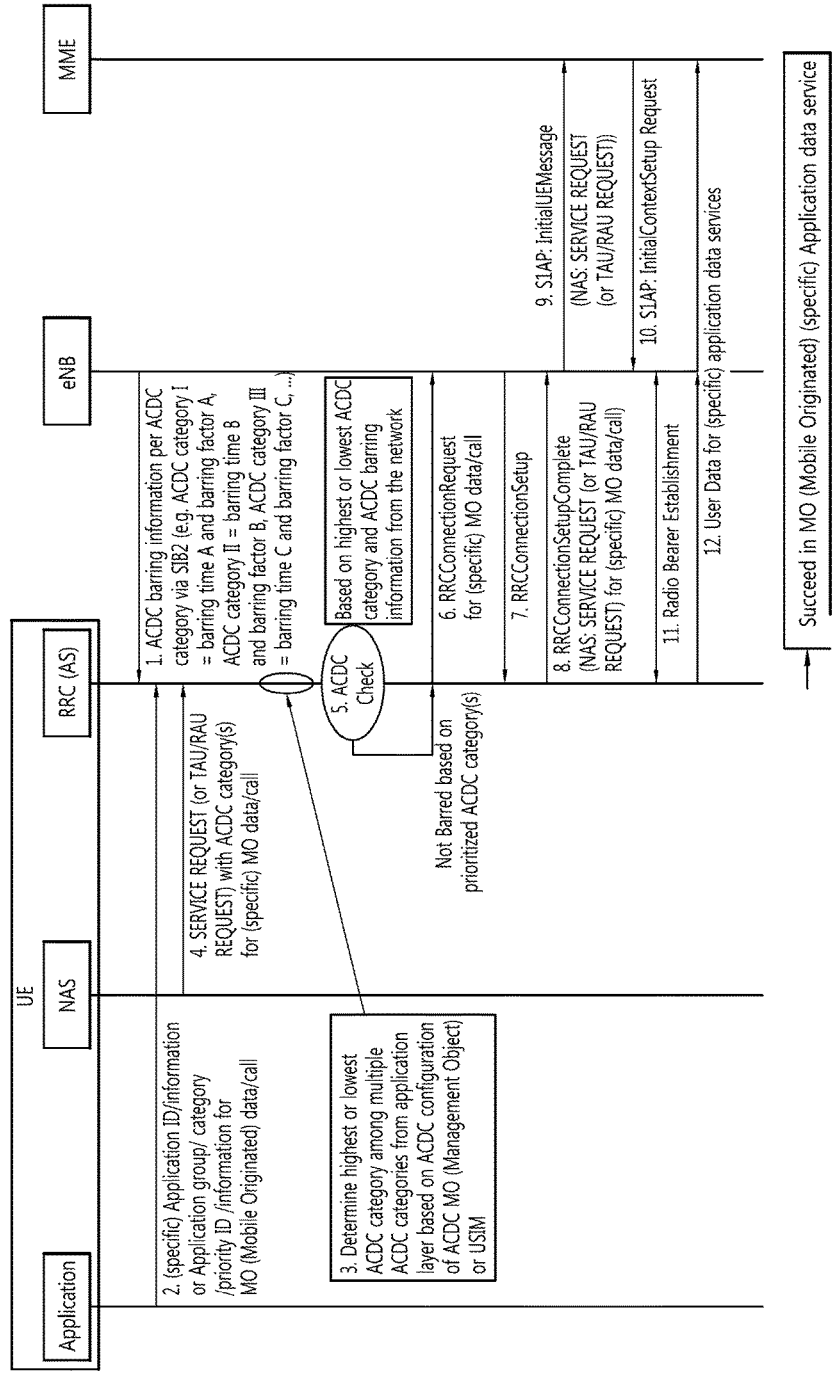

Referring to FIG. 19, the AS(RRC) layer of the UE selects the highest or lowest category among ACDC categories based on the application-related information. Then, the AS(RRC) layer of the UE performs the ACDC check based on the selected highest or lowest category.

Meanwhile, the proposals 5a and 5b illustrated in FIG. 16 will be described below according to expression of section D.1 of 3GPP standard document TS 24.301.

When the UE is configured for the ACDC, the NAS layer determines which ACDC category is applied for the request based on the application ID received from the higher layer. When one ACDC category is applied, the EMM sublayer may notify the ACDC category to the lower layer for the purpose of the access control, and when a plurality of ACDC categories is applied, the EMM sublayer may notify the ACDC category having the highest rank (alternatively, the lowest rank) to the lower layer for the purpose of the access control. However, the following cases are excluded.

a case where in the selected PLMN, the UE uses AC11 to AC15 a case where the request responds to the paging

Meanwhile, the proposals 5a and 5b illustrated in FIG. 16 will be described below according to expression of section 6.3 of 3GPP standard document TS 36.331.

The base station transmits SIB type 2 including common radio resource configuration information to all the UEs. The SIB type 2 may include the following information.

TABLE 8

```
[[                    acdc-BarringForMO-Signalling-r13 per ACDC category         AC-
BarringConfig                       OPTIONAL,      -- Need OP
                      acdc-BarringForMO-Data-r13 per ACDC category
                      AC-BarringConfig                OPTIONAL       -- Need OP
]]
}
ACDC-BarringConfig ::=                              SEQUENCE {
  acdc-BarringFactor                                                 ENUMERATED {
    p00, p05, p10, p15, p20, p25, p30, p40,
    p50, p60, p70, p75, p80, p85, p90, p95},
  acdc-BarringTime
    ENUMERATED {s4, s8, s16, s32, s64, s128, s256, s512},
  acdc-BarringForSpecialAC                                           BIT
STRING(SIZE(5))
}
ACDC-BarringPerPLMN-r13 ::=                         SEQUENCE {
  plmn-IdentityIndex-r13
    INTEGER(1..maxPLMN-r11),
  acdc-BarringInfo-r13
{                                                                    SEQUENCE
                      acdc-BarringForMO-Signalling-r13 per ACDC category         AC-
BarringConfig        OPTIONAL,      -- Need OP
                      acdc-BarringForMO-Data-r13 per ACDC category
  AC-BarringConfig                    OPTIONAL      -- Need OP
}
                                                                     OPTIONAL, -- Need OP
}
```

Each field of the above Table will be described as follows.

TABLE 9

Description of SIB type 2 field ac-BarringFactor
When a random value generated by the UE is smaller than a value of ac-BarringFactor, access is allowed. If not, the access is barred.
acdc-BarringFactor
When the random value generated by the UE is smaller than a value of acdc-BarringFactor, access is allowed. If not, the access is barred.
acdc-BarringForMO-Data per ACDC category
ACDC check for MO call per ACDC category
acdc-BarringForMO-Signalling per ACDC category
ACDC check for MO signaling per ACDC category
ACDC category
ACDC category (for example, ACDC Cat I, ACDC Cat II, . . . , ACDC Cat 128).
ac-BarringForSpecialAC
ACB check for ACs 11 to 15. The first/the leftmost bit is a bit for AC11 and the second bit is a bit for AC 12.
acdc-BarringForSpecialAC
ACB check for ACs 11 to 15. The first/the leftmost bit is a bit for AC11 and the second bit is a bit for AC 12.
ac-BarringTime
Mean access barring time (second)
acdc-BarringTime
Mean access barring time (second)

Meanwhile, the proposals 5*a* and 5*b* illustrated in FIG. 16 will be described below according to expression of section 5.3.3.2 of 3GPP standard document TS 36.331.

The UE performs the RRC connection procedure according to a request of the higher layer. When performing the procedure, the UE 1> provides the ACDC category and tries to establish the RRC connection for the MO call while the higher layer indicates the RRC connection request as an object of the ACDC check, 2> performs the ACDC barring check for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the UE provides the ACDC category and the UE establishes the RRC connection for the MO signaling, 2> the UE performs the ACDC barring check for each ACDC category by using Tyyy as Tbarring and acdc-BarringForMO-Signaling as an ACDC barring parameter.

2> In the case where the access is barred,

3> the UE notifies a failure of the RRC connection establishment to the higher layer and notifies that the ACDC is applied to the MO signaling.

Meanwhile, the UE performs the ACDC barring check as follows.

1> In the case where a timer T3xx or Tbarring is driving,

2> it is considered that the access to the corresponding cell is barred.

1> However, in the case where the SIB type 2 includes the ACDC barring parameter, 2> in the case where the UE stores one or more access classes 11 to 15 in the USIM, 2> with respect to at least one of available access classes, a corresponding bit of acdc-BarringForSpecialAC included in the ACDC barring parameter is set as 0.

3> 2> it is considered that the access to the corresponding cell is barred;

2> If not,

3> a random value rand which is evenly distributed to satisfy a range of 0≤rand<1 is generated.

3> In the case where the rand is smaller than the value indicated by acdc-BarringFactor included in the ACDC barring parameter, 4> it is considered that the access to the corresponding cell is not barred.

3> If not,

4> it is considered that the access to the corresponding cell is barred.

1> If not,

2> it is considered that the access to the corresponding cell is barred;

1> In the case where the access to the corresponding cell is barred and the timers Txxx and Tbarring are not driving, 2> a random value rand which is evenly distributed to satisfy a range of 0≤rand<1 is generated.

2> The timer Tbarring set as a timer value calculated as follows is driven by using acdc-BarringTime in the ACDC barring parameter.

"Tbarring"=(0.7+0.6*rand)*acdc-BarringTime.

Meanwhile, the proposals 5*a* and 5*b* illustrated in FIG. 17 will be described below according to expression of section D.1 of 3GPP standard document TS 24.301.

When the EMM sublayer requests the establishment of the NAS signaling access, the RRC establishment factor used by the UE is selected according to the NAS procedure. The EMM sublayer notifies a call type related with the RRC connection establishment factor for controlling the access control to the lower layer. When the UE is configured for ExtendedAccessBarring (EAB), the EMM sublayer notifies that the EAB is applied to the request to the lower layer for the purpose of the access control.

TABLE 10

| NAS procedure | RRC establishment factor | Call type |
|---|---|---|
| Tracking Area Update | In the case where the UE does not have the PDN connection established for an emergency bearer service and does not start the PDN connection request having the request type configured as "emergency", and in the case where the UE triggers for MO ACDC category 1, the RRC establishment factor is set as MO signaling. | "originating ACDC Cat I" |
| | In the case where the UE does not have the PDN connection established for the emergency bearer service and does not start the PDN connection request having the request type set as "emergency", and in the case where the UE triggers for MO ACDC category II, the RRC establishment factor is set as MO signaling. | "originating ACDC Cat II" |
| | In the case where the UE does not have the PDN connection established for the emergency bearer service and does not start the PDN connection request having the request type set as "emergency", and in the case where the UE triggers for MO ACDC category III, the RRC establishment factor is set as MO signaling. | "originating ACDC Cat III" |
| | In the case where the UE does not have the PDN connection established for an emergency bearer service and does not start the PDN connection request having the request type configured as | "originating ACDC Cat IV" |

TABLE 10-continued

| NAS procedure | RRC establishment factor | Call type |
|---|---|---|
| | "emergency", and in the case where the UE triggers for MO ACDC category IV, the RRC establishment factor is set as MO signaling. | |
| | In the case where the UE does not have the PDN connection established for an emergency bearer service and does not start the PDN connection request having the request type configured as "emergency", and in the case where the UE triggers for MO ACDC category V, the RRC establishment factor is set as MO signaling. | "originating ACDC Cat V" |
| Service Request | In the case where the service request is to request a radio resource of a user plane, an MO MMTEL voice call is not started, an MO MMTEL video call is not started, and MO SMSoIP is not started, the RRC establishment factor is set as MO data. | "originating calls" |
| | In the case where the service request procedure is to request a radio resource of a user plane and triggered for MO ACDC category I, the RRC establishment factor is set as MO data. | "originating ACDC Cat I" |
| | In the case where the service request procedure is to request the radio resource of the user plane and triggered for MO ACDC category II, the RRC establishment factor is set as MO data. | "originating ACDC Cat II" |
| | In the case where the service request procedure is to request the radio resource of the user plane and triggered for MO ACDC category III, the RRC establishment factor is set as MO data. | "originating ACDC Cat III" |
| | In the case where the service request procedure is to request the radio resource of the user plane and triggered for MO ACDC category IV, the RRC establishment factor is set as MO data. | "originating ACDC Cat IV" |
| | In the case where the service request procedure is to request a radio resource of a user plane and triggered for MO ACDC category V, the RRC establishment factor is set as MO data. | "originating ACDC Cat V" |

Meanwhile, the proposals 5a and 5b illustrated in FIG. 17 will be described below according to expression of section 6.3 of 3GPP standard document TS 36.331.

The base station transmits SIB type 2 including common radio resource configuration information to all the UEs. The SIB type 2 may include the following information.

Each field of the above Table will be described as follows

TABLE 12

Description of SIB type 2 field ac-BarringFactor
When a random value generated by the UE is smaller than a value of ac-BarringFactor, access is allowed. If not, the access is barred.
acdc-BarringFactor
When the random value generated by the UE is smaller than a value of acdc-BarringFactor, access is allowed. If not, the access is barred.
acdc-BarringForMO-Data per ACDC category
ACDC check for MO call per ACDC category
acdc-BarringForMO-Signalling per ACDC category
ACDC check for MO signaling per ACDC category
ACDC category
ACDC category (for example, ACDC Cat I, ACDC Cat II, . . . , ACDC Cat 128).
ac-BarringForSpecialAC
ACB check for ACs 11 to 15. The first/the leftmost bit is a bit for AC11 and the second bit is a bit for AC 12.
acdc-BarringForSpecialAC
ACB check for ACs 11 to 15. The first/the leftmost bit is a bit for AC11 and the second bit is a bit for AC 12.
ac-BarringTime
Mean access barring time (second)
acdc-BarringTime
Mean access barring time (second)

The proposals 5a and 5b illustrated in FIG. 17 will be described below according to expression of section 5.3.3.2 of 3GPP standard document TS 36.331.

The UE performs the RRC connection procedure according to a request of the higher layer. When performing the procedure, in the case where the UE 1> provides the ACDC category and tries to establish the RRC connection for the ACDC category I while the higher layer indicates the RRC connection request as an object of the ACDC check, 2> performs the ACDC barring check for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

TABLE 11

```
[[                          acdc-BarringForMO-Signalling-r13 per ACDC category              AC-BarringConfig
                                     OPTIONAL,       -- Need OP
                            acdc-BarringForMO-Data-r13 per ACDC category
                            AC-BarringConfig                           OPTIONAL              -- Need OP
                            ]]
}
ACDC-BarringConfig ::=                                                SEQUENCE {
                            acdc-BarringFactor                                               ENUMERATED {
                            p00, p05, p10, p15, p20, p25, p30, p40,
                            p50, p60, p70, p75, p80, p85, p90, p95},
                            acdc-BarringTime                                                 ENUMERATED
{s4, s8, s16, s32, s64, s128, s256, s512},
}                           acdc-BarringForSpecialAC                                         BIT STRING(SIZE(5))
ACDC-BarringPerPLMN-r13 ::=                                           SEQUENCE {
                            plmn-IdentityIndex-r13                                           INTEGER(1..maxPLMN-
r11),
                            acdc-BarringInfo-r13                                             SEQUENCE {
                              acdc-BarringForMO-Signalling-r13 per ACDC category              AC-BarringConfig
                            OPTIONAL,      -- Need OP
                              acdc-BarringForMO-Data-r13 per ACDC category
                            AC-BarringConfig           OPTIONAL        -- Need OP
                            }
                                                                      OPTIONAL,-- Need OP
}
```

1> Meanwhile, in the case where the UE provides the ACDC category and tries to establish the RRC connection for the ACDC category I while the higher layer indicates the RRC connection request as an object of the ACDC check,
2> the UE performs the ACDC barring check for each ACDC category by using Tyyy as Tbarring and acdc-BarringForMO-Signaling as an ACDC barring parameter.
2> In the case where the access is barred,
3> the UE notifies a failure of the RRC connection establishment to the higher layer and notifies that the ACDC is applied to the MO signaling.

Meanwhile, the UE performs the ACDC barring check as follows.
1> In the case where a timer T3xx or Tbarring is driving,
2> it is considered that the access to the corresponding cell is barred.
1> However, in the case where the SIB type 2 includes the ACDC barring parameter,
2> in the case where the UE stores one or more access classes 11 to 15 in the USIM,
2> with respect to at least one of available access classes, a corresponding bit of acdc-BarringForSpecialAC included in the ACDC barring parameter is set as 0.
3> It is considered that the access to the corresponding cell is not barred.
2> If not,
3> a random value rand which is evenly distributed to satisfy a range of 0≤rand<1 is generated.
3> In the case where the rand is smaller than the value indicated by acdc-BarringFactor included in the ACDC barring parameter,
4> it is considered that the access to the corresponding cell is not barred.
3> If not,
4> it is considered that the access to the corresponding cell is barred.

1> If not,
2> it is considered that the access to the corresponding cell is barred;
1> In the case where the access to the corresponding cell is barred and the timers Txxx and Tbarring are not driving,
2> a random value rand which is evenly distributed to satisfy a range of 0≤rand<1 is generated.
2> The timer Tbarring set as a timer value calculated as follows is driven by using acdc-BarringTime in the ACDC barring parameter.

"Tbarring"=(0.7+0.6*rand)*acdc-BarringTime.

Meanwhile, the proposals 5a and 5b illustrated in FIG. 18 will be described below according to expression of section D.1 of 3GPP standard document TS 24.301.

When the UE is configured for the ACDC, the NAS layer determines which ACDC category is applied for the request based on the application ID received from the higher layer. When one ACDC category is applied, the EMM sublayer may notify the ACDC category to the lower layer for the purpose of the access control, and when a plurality of ACDC categories is applied, the EMM sublayer may notify all of the ACDC categories to the lower layer for the purpose of the access control. However, the following cases are excluded.

a case where in the selected PLMN, the UE uses AC11 to AC15 a case where the request responds to the paging

Meanwhile, the proposals 5a and 5b illustrated in FIG. 18 will be described below according to expression of section 6.3 of 3GPP standard document TS 36.331.

The base station transmits SIB type 2 including common radio resource configuration information to all the UEs. The SIB type 2 may include the following information.

TABLE 13

| [[ BarringConfig | acdc-BarringForMO-Signalling-r13 per ACDC category OPTIONAL, -- Need OP acdc-BarringForMO-Data-r13 per ACDC category AC-BarringConfig OPTIONAL ]] | AC- -- Need OP |
|---|---|---|
| } ACDC-BarringConfig ::= | acdc-BarringFactor p00, p05, p10, p15, p20, p25, p30, p40, p50, p60, p70, p75, p80, p85, p90, p95}, acdc-BarringTime ENUMERATED {s4, s8, s16, s32, s64, s128, s256, s512}, acdc-BarringForSpecialAC | SEQUENCE { ENUMERATED { BIT |
| STRING(SIZE(5)) } ACDC-BarringPerPLMN-r13 ::= | plmn-IdentityIndex-r13 INTEGER(1..maxPLMN-r11), acdc-BarringInfo-r13 | SEQUENCE { SEQUENCE |
| { BarringConfig | acdc-BarringForMO-Signalling-r13 per ACDC category OPTIONAL, -- Need OP acdc-BarringForMO-Data-r13 per ACDC category AC-BarringConfig OPTIONAL -- Need OP } OPTIONAL, | AC- -- Need OP |
| } | | |

Each field of the above Table will be described as follows

TABLE 14

```
[[                    acdc-BarringForMO-Signalling-r13 per ACDC category              AC-
BarringConfig                         OPTIONAL,           -- Need OP
                      acdc-BarringForMO-Data-r13 per ACDC category
                      AC-BarringConfig                                     OPTIONAL  -- Need OP
                      ]]
}
ACDC-BarringConfig ::=                                                     SEQUENCE {
                      acdc-BarringFactor                                   ENUMERATED {
                      p00, p05, p10, p15, p20, p25, p30, p40,
                      p50, p60, p70, p75, p80, p85, p90, p95},
                      acdc-BarringTime
                      ENUMERATED {s4, s8, s16, s32, s64, s128, s256, s512},
                      acdc-BarringForSpecialAC                             BIT
STRING(SIZE(5))
}
ACDC-BarringPerPLMN-r13 ::=                                  SEQUENCE {
                      plmn-IdentityIndex-r13
                      INTEGER(1..maxPLMN-r11),
                      acdc-BarringInfo-r13                                                SEQUENCE
{
                      acdc-BarringForMO-Signalling-r13 per ACDC category              AC-
BarringConfig         OPTIONAL,           -- Need OP
                      acdc-BarringForMO-Data-r13 per ACDC category
                      AC-BarringConfig      OPTIONAL        -- Need OP
                      }
                                                             OPTIONAL,    -- Need OP
}
```

The proposals 5a and 5b illustrated in FIG. 18 will be described below according to expression of section 5.3.3.2 of 3GPP standard document TS 36.331.

The UE performs the RRC connection procedure according to a request of the higher layer. When performing the procedure, in the case where the UE 1> provides a plurality of ACDC category ID/information and tries to establish the RRC connection for the MO call while the higher layer indicates the RRC connection request as an object of the ACDC check, 2> the UE determines the highest or lowest ACDC category among the plurality of ACDC categories provided from the higher layer.

2> The UE performs the ACDC barring check for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the UE provides the plurality of ACDC categories and tries to establish the RRC connection for the MO signaling, 2> the UE determines the highest or lowest ACDC category among the plurality of ACDC categories provided from the higher layer.

2> The UE performs the ACDC barring check for each ACDC category by using Tyyy as Tbarring and acdc-BarringForMO-Signaling as an ACDC barring parameter.

2> In the case where the access is barred,

3> the UE notifies a failure of the RRC connection establishment to the higher layer and notifies that the ACDC is applied to the MO signaling.

Meanwhile, the UE performs the ACDC barring check as follows.

1> In the case where a timer T3xx or Tbarring is driving,

2> it is considered that the access to the corresponding cell is barred.

1> However, in the case where the SIB type 2 includes the ACDC barring parameter, 2> in the case where the UE stores one or more access classes 11 to 15 in the USIM, 2> with respect to at least one of available access classes, a corresponding bit of acdc-BarringForSpecialAC included in the ACDC barring parameter is set as 0.

3> It is considered that the access to the corresponding cell is not barred.

2> If not,

3> a random value rand which is evenly distributed to satisfy a range of 0≤rand<1 is generated.

3> In the case where the rand is smaller than the value indicated by acdc-BarringFactor included in the ACDC barring parameter, 4> it is considered that the access to the corresponding cell is not barred.

3> If not,

4> it is considered that the access to the corresponding cell is barred.

1> If not,

2> it is considered that the access to the corresponding cell is barred;

1> In the case where the access to the corresponding cell is barred and the timers Txxx and Tbarring are not driving, 2> a random value rand which is evenly distributed to satisfy a range of 0≤rand<1 is generated.

2> The timer Tbarring set as a timer value calculated as follows is driven by using acdc-BarringTime in the ACDC barring parameter.

"Tbarring"=(0.7+0.6*rand)*acdc-BarringTime.

Meanwhile, the proposals 5a and 5b illustrated in FIG. 19 will be described below according to expression of section 5.3.3.2 of 3GPP standard document TS 36.331.

1> In the case where the UE provides the application group/category/priority/ID/information and tries to establish the RRC connection for the MO call while the higher layer indicates the RRC connection request as an object of the ACDC check, 2> the UE determines the highest or lowest ACDC category based on the ACDC configuration information.

2> The UE performs the ACDC barring check for each ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> In the case where the UE provides the application-related information (that is, the group/category/priority/ID/information) and tries to establish the RRC connection for the MO signaling while the higher layer indicates the RRC connection request as an object of the ACDC check, 2> the UE determines the highest or lowest ACDC category based on the ACDC configuration information.

2> The UE performs the ACDC barring check for each ACDC category by using Tyyy as Tbarring and acdc-BarringForMO-Signaling as an ACDC barring parameter.

2> In the case where the access is barred,

3> the UE notifies a failure of the RRC connection establishment to the higher layer and notifies that the ACDC is applied to the MO signaling.

V-3. Proposal 5c

In the case where the application-related information (that is, the application group/category/priority information/ID)+ the application ID/information/indication received from the application layer is multiple or changed unlike the previous information in the NAS recovery process, i) based on the obtained application-related information (that is, the application group/category/priority information/ID, the application group/category/priority for the application ID/information/indication received from the application layer is determined. In this case, the highest application-related information (that is, the application group/category/priority information/ID) is selected. Thereafter, based on the ACDC configuration information (the information including barring rates, barring factor, mean barring time, ACB skipping configuration, and the like for each application group/category/priority information/ID) received from the AS(RRC) layer (in this case, based on the highest application-related information (that is, the application group/category/priority information/ID)), the ACDC check for the application service start request from the application layer is performed. When the ACDC check is passed, the service request procedure or the TAU procedure therefor is performed. When the ACDC check is not passed, the service request procedure or the TAU procedure therefor is not performed.

ii) Based on the obtained application-related information (that is, the application group/category/priority information/ID, the application group/category/priority for the application ID/information/indication received from the application layer is determined. In this case, the lowest application-related information (that is, the application group/category/priority information/ID) is selected. Thereafter, based on the ACDC configuration information (that is, the information including barring rates, barring factor, mean barring time, ACB skipping information, and the like for each application group/category/priority information/ID) received from the AS(RRC) layer (in this case, based on the lowest application-related information (that is, the application group/category/priority information/ID)), the ACDC check for the application service start request from the application layer is performed. When the ACDC check is passed, the service request procedure or the TAU procedure therefor is performed. When the ACDC check is not passed, the service request procedure or the TAU procedure therefor is not performed.

the schemes i) and ii) are recognized and determined by the NAS layer, and in this case, one of the schemes i) and ii) may be implemented and operated by network configuration/policy, UE capability, and the like.

In the case where the application ID/information/indication received from the application layer is multiple or changed unlike the previous information in the NAS recovery process, the multiple application ID/information/indication (both the previous information and the changed information) may be provided to the AS(RRC) layer.

In the case where the application ID/information/indication received from the NAS layer is multiple, i) based on the obtained application-related information (that is, the application group/category/priority information/ID), the application group/category/priority for the application ID/information/indication received from the NAS layer is determined. Thereafter, the RRC connection request procedure for the application service access is performed (ACDC check). In this case, the RRC connection request procedure for the application service access is performed by selecting the highest application-related information (that is, the application group/category/priority information/ID) (ACDC check). Alternatively, ii) Based on the obtained application-related information (that is, the application group/category/priority information/ID, the application group/category/priority for the application ID/information/indication received from the NAS layer is determined. Thereafter, the RRC connection request procedure for the application service access is performed (ACDC check). In this case, the RRC connection request procedure for the application service access is performed by selecting the lowest application-related information (that is, the application group/category/priority information/ID) (ACDC check).

The schemes i) and ii) are recognized and determined by the AS(RRC) layer, and in this case, one of the schemes i) and ii) may be implemented and operated by network configuration/policy, UE capability, and the like.

Figure 20:
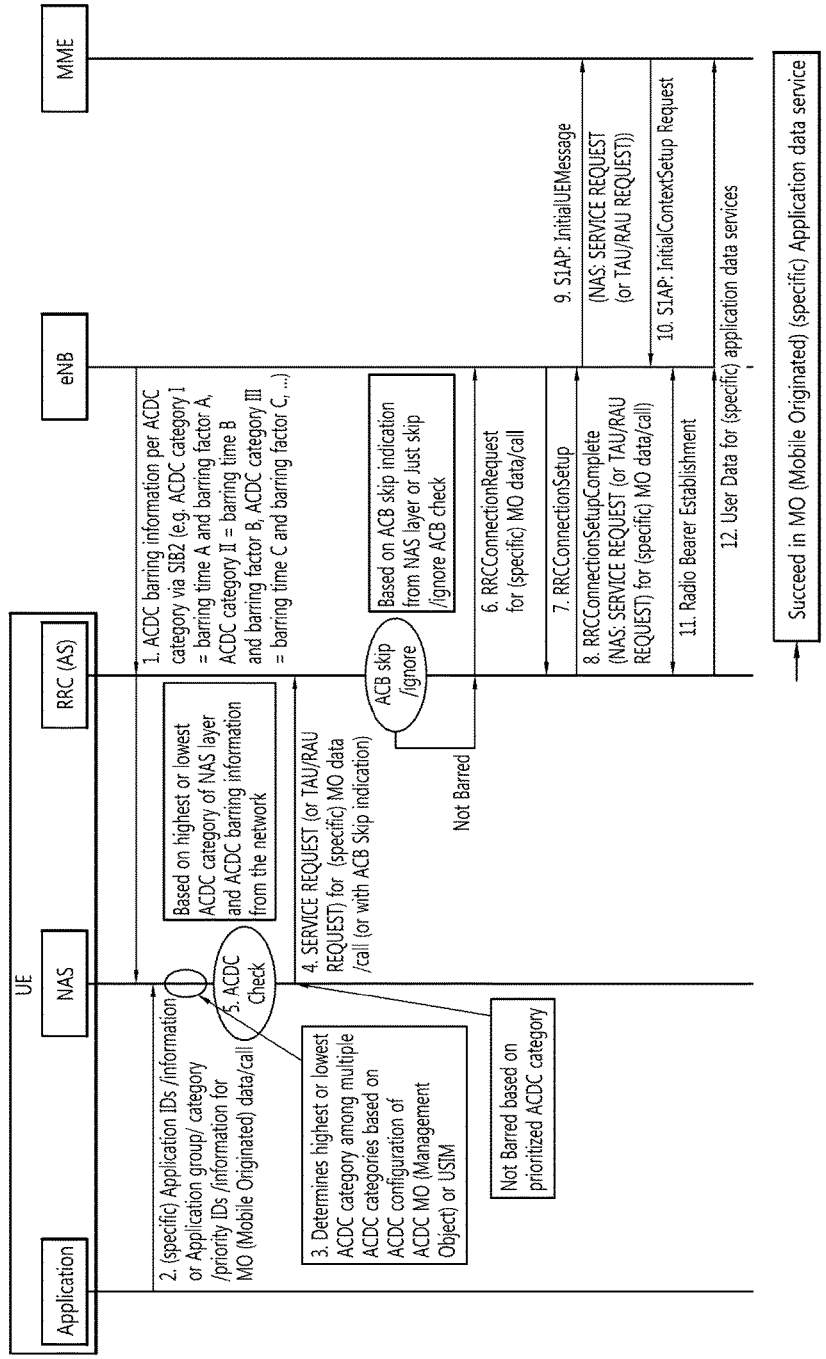
FIGS. 20 and 21 are exemplary diagrams illustrating a signal flow according to a proposal 5c.
Figure 21:
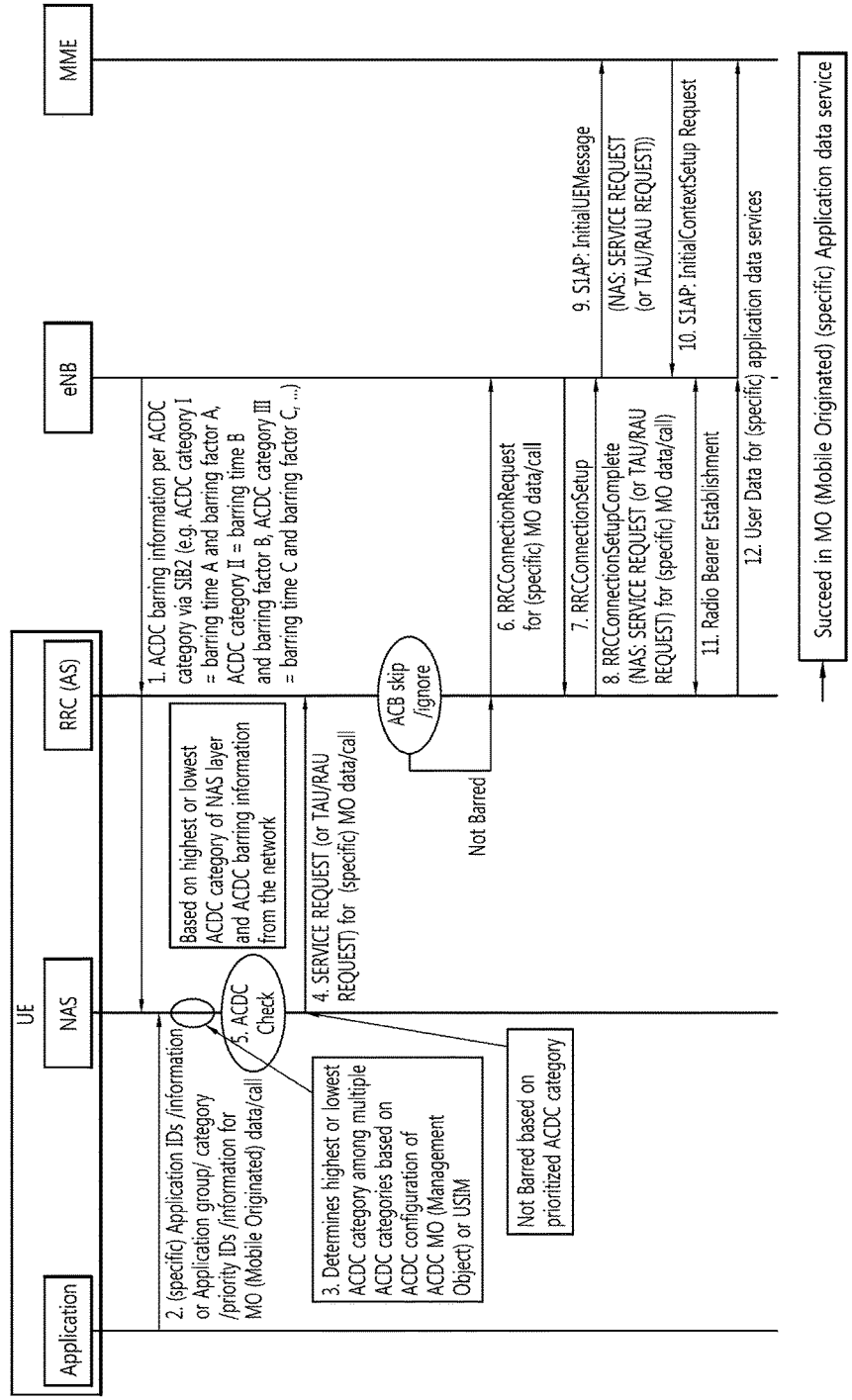

FIGS. 20 and 21 are exemplary diagrams illustrating a signal flow according to a proposal 5c.

Referring to FIG. 20, in the case where the application-related information (that is, the application group/category/priority information/ID)+the application ID/information/indication received from the application layer is multiple, the NAS layer determines the highest or lowest ACDC category. Subsequently, the NAS layer performs the ACDC check based on the determined highest or lowest ACDC category. When the ACDC check is passed, the NAS layer transmits the ACB skipping indication to the AS(RRC) layer. The AS(RRC) layer skips (does not performs) the general ACB after receiving the ACB skipping indication. Alternatively, the AS(RRC) layer skips (does not performs) the general ACB without receiving the ACB skipping indication.

Referring to FIG. 21, in the case where the application-related information (that is, the application group/category/priority information/ID)+the application ID/information/indication received from the application layer is multiple, the NAS layer determines the highest or lowest ACDC category.

V-4. Proposal 5d

The proposed connection differentiation method (ACDC check) for each application group/category/priority information/ID is not applied to the service request procedure performed by the UE as a response for the paging and emergency calls (CSFB emergency calls, 1×CSFB emergency calls, and an IMS emergency service) performed by the UE. However, the ACB may be applied (alternatively, service specific access control (SSAC) and the ACB may be applied). In this case, when the NAS layer of the UE recognizes the start of the service request procedure and the start of the emergency call which are performed as the response for the paging, the application-related information (that is, the application group/category/priority information/ID) is not notified to the AS(RRC) layer, and thus, the AS(RRC) layer does not perform the ACDC check, but may perform the general ACB.

The proposals 5a, 5b, 5c, and 5d of the present invention may be applied in combination with the proposals 1, 2, 3, and 4 of the present invention.

Meanwhile, the proposals described above may be combined.

The contents described above may be implemented by hardware. This will be described with reference to the accompanying drawings.

Figure 22:
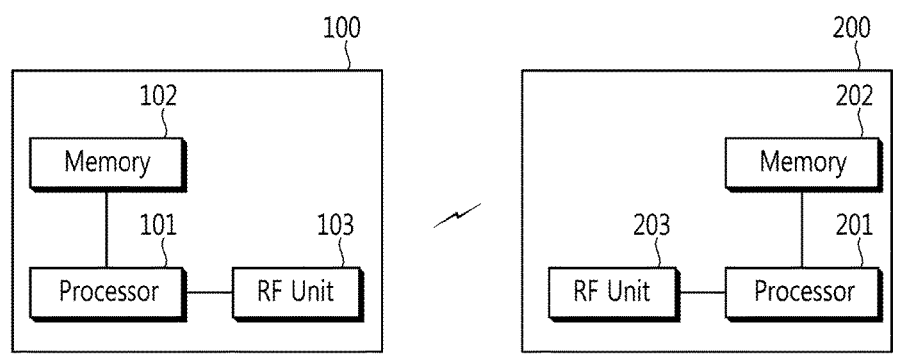
FIG. 22 is a configuration block diagram of UE 100 and a base station 200 according to the exemplary embodiment of the present invention.

FIG. 22 is a configuration block diagram of UE 100 and a base station 200 according to the exemplary embodiment of the present invention.

As illustrated in FIG. 22, the UE 100 includes a storage means 101, a controller 102, and a transceiver 103. In addition, the base station 200 includes a storage means 201, a controller 202, and a transceiver 203.

The storage means 101 and 201 store the aforementioned methods.

The controllers 102 and 202 control the storage means 101 and 201 and the transceivers 103 and 203. In detail, the controllers 102 and 202 execute the methods stored in the storage means 101 and 201, respectively. In addition, the controllers 102 and 202 transmit the aforementioned signals through the transceivers 103 and 203.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A network access method performed by a user equipment (UE), the method comprising:
acquiring application information from a higher layer when application specific congestion control for data communication (ACDC) is configured;
determining an ACDC category for a network access request of an application based on the acquired application information; and
performing an ACDC check based on the determined ACDC category,
wherein the network access request is barred or allowed according to the ACDC check, and
wherein when a plurality of ACDC categories are available for the network access request of the application, a highest ACDC category among the plurality of ACDC categories is selected to perform the ACDC check.

2. The method of claim 1, wherein the application information includes an application identifier.

3. The method of claim 1 further comprising:
receiving ACDC configuration information, and
wherein determining the ACDC category comprises comparing the ACDC configuration information and the application information.

4. The method of claim 3, wherein the ACDC configuration information includes at least one application identifier and, for each at least one application identifier, a corresponding application category.

5. The method of claim 1, wherein the application information comprises a plurality of application identifiers, and wherein determining the ACDC category further comprises:
determining an ACDC category for each of the plurality of application identifiers; and
determining which of the ACDC categories has the highest priority level.

6. The method of claim 1, wherein determining the ACDC category comprises:
identifying the ACDC category from among a plurality of ACDC categories, each ACDC category having a corresponding priority level.

7. The method of claim 6,
wherein acquiring application information comprises acquiring application information for a plurality of applications, and
wherein determining the ACDC category further comprises:
determining the ACDC category for each of the plurality of applications, and
determining which of the ACDC categories has the highest priority level.

8. The method of claim 7, wherein performing the ACDC check comprises:
performing the ACDC check based on the ACDC category having the highest priority level.

9. A user equipment capable of accessing a network comprising:
a transceiver; and
a processor that controls the transceiver, wherein the processor:
acquires application information from a higher layer when application specific congestion control for data communication (ACDC) is configured;
determines an ACDC category for a network access request of an application based on the acquired application information; and
performs an ACDC check based on the determined ACDC category,
wherein the network access request is barred or allowed according to the ACDC check, and
wherein when a plurality of ACDC categories are available for the network access request of the application, a highest ACDC category among the plurality of ACDC categories is selected to perform the ACDC check.

10. The user equipment of claim 9, wherein the application information includes an application identifier.

11. The user equipment of claim 9,
wherein the processor further controls the transceiver to receive ACDC configuration information, and
wherein the processor determines the ACDC category by comparing the ACDC configuration information and the application information.

12. The user equipment of claim 11, wherein the ACDC configuration information includes at least one application identifier and, for each at least one application identifier, a corresponding application category.

13. The user equipment of claim 9, wherein the processor, in determining the ACDC category, identifies the ACDC category from among a plurality of ACDC categories, each ACDC category having a corresponding priority level.

14. The user equipment of claim 13,
wherein the processor, in acquiring application information, acquires application information for a plurality of applications, and
wherein the processor, in determining the ACDC category,
determines the ACDC category for each of the plurality of applications, and
determines which of the ACDC categories has the highest priority level.

* * * * *